US012684567B2

(12) United States Patent
Feng et al.

(10) Patent No.: US 12,684,567 B2
(45) Date of Patent: Jul. 14, 2026

(54) UPLINK CONFIGURATION METHOD, USER EQUIPMENT, AND BASE STATION

(71) Applicant: TCL COMMUNICATION (NINGBO) CO., LTD., Ningbo (CN)

(72) Inventors: Aijuan Feng, Ningbo (CN); Jia Sheng, Ningbo (CN)

(73) Assignee: TCL COMMUNICATION (NINGBO) CO., LTD., Ningbo (CN)

( * ) Notice: Subject to any disclaimer, the term of this patent is extended or adjusted under 35 U.S.C. 154(b) by 306 days.

(21) Appl. No.: 18/290,165

(22) PCT Filed: May 11, 2021

(86) PCT No.: PCT/CN2021/093048
§ 371 (c)(1),
(2) Date: Nov. 10, 2023

(87) PCT Pub. No.: WO2022/236675
PCT Pub. Date: Nov. 17, 2022

(65) Prior Publication Data
US 2024/0276487 A1     Aug. 15, 2024

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0003* (2013.01); *H04L 5/0012* (2013.01); *H04W 72/231* (2023.01)

(58) Field of Classification Search
CPC ....... H04L 1/08; H04L 1/0072; H04L 1/0064; H04L 1/0028; H04L 5/0037; H04W 24/08;
(Continued)

(56) References Cited

U.S. PATENT DOCUMENTS

| | | | | |
|---|---|---|---|---|
| 2014/0301231 A1* | 10/2014 | Hooli | .......... | H04W 24/08 |
| | | | | 370/252 |
| 2018/0035242 A1* | 2/2018 | Yi | .......... | H04L 5/0037 |

FOREIGN PATENT DOCUMENTS

WO          2021020826 A1     2/2021

OTHER PUBLICATIONS

International Search Report in International application No. PCT/CN2021/093048, mailed on Jan. 30, 2022.
(Continued)

*Primary Examiner* — Mahran Y Abu Roumi
(74) *Attorney, Agent, or Firm* — PV IP PC; Wei Te Chung

(57) ABSTRACT

A user equipment (UE) and a base station uplink configuration execute a method comprising negotiating coverage enhancement configuration for uplink transmission. The UE allocates coverage enhancement representations of at least one transport block (TB) into a set of the uplink radio resources for uplink transmission based on the coverage enhancement configuration. The coverage enhancement configuration comprises time domain window configuration, bundling configuration, and/or frequency hopping configuration of the coverage enhancement representations. The coverage enhancement representations may comprise repetitions of a TB, or segments of a TB. Alternatively, the coverage enhancement representations may comprise TBs commonly share a scheduling downlink control information (DCI) message or an uplink grant that schedules the TBs.

20 Claims, 16 Drawing Sheets

(51) Int. Cl.
*H04L 5/00* (2006.01)
*H04W 72/231* (2023.01)

(58) Field of Classification Search
CPC ....... H04W 24/10; H04W 72/20; H04W 4/70;
H04W 72/044; H04W 72/0446
See application file for complete search history.

(56) References Cited

OTHER PUBLICATIONS

Written Opinion of the International Search Authority in International application No. PCT/CN2021/093048, mailed on Jan. 30, 2022.
China Telecom. "Summary of email discussion on joint" 3GPP TSG RAN WG1 Meeting #104bis-e R1-2104006, vol. No. Apr. 21, 2021 (Apr. 21, 2021), ISSN:. part 1 to part 5.
European Search Report in European application No. 21941251.7, mailed on Jan. 9, 2025.
NPL1: Lenovo et al: "Enhancements for TB processing over multi-slot PUSCH",3GPP Draft; R1-2103616, [retrieved on Apr. 7, 2021].
NPL2: China Telecom: "Discussion on TB processing over multi-slot PUSCH"3GPP Draft; R1-2102861,[retrieved on Apr. 6, 2021].
NPL3: Moderator (Nokia et al: "Final FL summary of TB processing over multi-slot PUSCH (AI 8.8.1.2)",3GPP Draft; R1-2104102,[retrieved on Apr. 20, 2021].

* cited by examiner

Rep#1  Rep#2  Rep#3  Rep#4

Type A:

Slot#1  Slot#2  Slot#3  Slot#4

Nominal Nominal Nominal Nominal
Rep#1  Rep#2  Rep#3  Rep#4

Type B:

Slot#1  Slot#2  Slot#3

UPLINK CONFIGURATION METHOD, USER EQUIPMENT, AND BASE STATION

CROSS REFERENCE TO RELATED APPLICATIONS

The disclosure is a US national phase application based upon an International Application No. PCT/CN2021/093048, filed on May 11, 2021, titled "UPLINK CONFIGURATION METHOD, USER EQUIPMENT, AND BASE STATION", which is incorporated by reference in the present application in its entirety.

TECHNICAL FIELD

The present disclosure relates to the field of communication systems, and more particularly, to an uplink configuration method, a user equipment, and a base station.

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) which provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network. (EUTRAN), for a mobile access network where one or more macro-cells are supported by a base station known as an eNodeB or eNB (evolved NodeB). More recently. LTE is evolving further towards the so-called 5G or NR (new radio) systems where one or more cells are supported by a base station known as a gNB.

Technical Problem

In 3GPP Release 17, the work item "NR coverage enhancements" is in progress. Coverage is one of the key factors of service quality for a cellular communication network. Compared to LTE. NR is designed to operate at much higher frequencies such as 28 GHz or 39 GHz in FR2. Due to the higher frequencies, it is inevitable that NR wireless channels will be subject to higher path-loss making it more challenging to maintain an adequate quality of service comparable to that of legacy radio access technologies (RATs). Coverage-enhancement techniques are essentially providing UEs with good service quality wherever the UEs are located.

Coverage enhancement is to specify enhancements for physical uplink shared channel (PUSCH), physical uplink control channel (PUCCH) and Msg3 PUSCH for both FR1 and FR2 as well as time-division duplex (TDD) and frequency-division duplex (FDD). The most valuable resource for coverage enhancement is the time resource, so the time resource should be exploited for efficient use. Back-to-back PUSCH transmission has zero gap in-between adjacent PUSCH transmissions. For non-back-to-back transmission with non-zero gap, if a UE has no downlink reception in-between PUSCH repetitions in the same band in a time division duplex (TDD) case, resource utilization is reduced.

It is desired to provide methods to solve the problem of joint channel estimation (JCE) for PUSCH and PUCCH.

Technical Solution

An object of the present disclosure is to propose an uplink configuration method, a user equipment, and a base station In a first aspect, an embodiment of the invention provides an uplink configuration method, executable in a user equipment (UE), comprising:

negotiating coverage enhancement configuration for uplink transmission;

allocating coverage enhancement representations of at least one transport block (TB) into a set of the uplink radio resources for uplink transmission based on the coverage enhancement configuration, wherein the coverage enhancement configuration comprises bundling configuration and/or time domain window configuration of the coverage enhancement representations.

In a second aspect, an embodiment of the invention provides uplink configuration method, executable in a base station, comprising:

negotiating coverage enhancement configuration for uplink transmission;

receiving coverage enhancement representations of at least one transport block (TB) on a set of the uplink radio resources in uplink transmission based on the coverage enhancement configuration, wherein the coverage enhancement configuration comprises bundling configuration and/or time domain window configuration of the coverage enhancement representations.

In a third aspect, an embodiment of the invention provides a user equipment (UE) comprising a transceiver and a processor. The processor is connected to the transceiver and configured to execute the following steps:

negotiating coverage enhancement configuration for uplink transmission:

allocating coverage enhancement representations of at least one transport block (TB) into a set of the uplink radio resources for uplink transmission based on the coverage enhancement configuration, wherein the coverage enhancement configuration comprises bundling configuration and/or time domain window configuration of the coverage enhancement representations.

In a fourth aspect, an embodiment of the invention provides a base station comprising a transceiver and a processor. The processor is connected to the transceiver and configured to execute the following steps:

negotiating coverage enhancement configuration for uplink transmission;

receiving coverage enhancement representations of at least one transport block (TB) on a set of the uplink radio resources in uplink transmission based on the coverage enhancement configuration, wherein the coverage enhancement configuration comprises bundling configuration and/or time domain window configuration of the coverage enhancement representations.

The disclosed method may be implemented in a chip. The chip may include a processor, configured to call and run a computer program stored in a memory, to cause a device in which the chip is installed to execute the disclosed method.

The disclosed method may be programmed as computer executable instructions stored in non-transitory computer-readable medium. The non-transitory computer readable medium, when loaded to a computer, directs a processor of the computer to execute the disclosed method.

The non-transitory computer-readable medium may comprise at least one from a group consisting of: a hard disk, a CD-ROM, an optical storage device, a magnetic storage device, a read only memory, a programmable read only memory, an erasable programmable read only memory, EPROM, an electrically erasable programmable read only memory and a flash memory.

The disclosed method may be programmed as computer program product, that causes a computer to execute the disclosed method.

The disclosed method may be programmed as a computer program, that causes a computer to execute the disclosed method.

Advantageous Effects

Embodiments of this disclosure is to provide methods to solve the problem of joint channel estimation (JCE) for PUSCH. The invention provides specific methods for how to define/indicate bundling for PUSCH transmission, and the JCE conditions can also be met even in non-back-to-back transmission scenarios. This can help get a joint channel estimation gain. These methods are also applicable for PUCCH. MSG3 PUSCH and MSGA PUSCH.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Fifth-generation (5G) wireless systems are generally a cellular communication system in a frequency range 2 (FR2) ranging from 24.25 GHz to 52.6 GHz, where multiplex transmit (Tx) and receive (Rx) beams are employed by a base station (BS) and/or a user equipment (UE) to combat a large path loss in a high frequency band. Due to hardware limitations and costs, the BS and the UE might only be equipped with a limited number of transmission and reception units (TXRUs).

Figure 1:
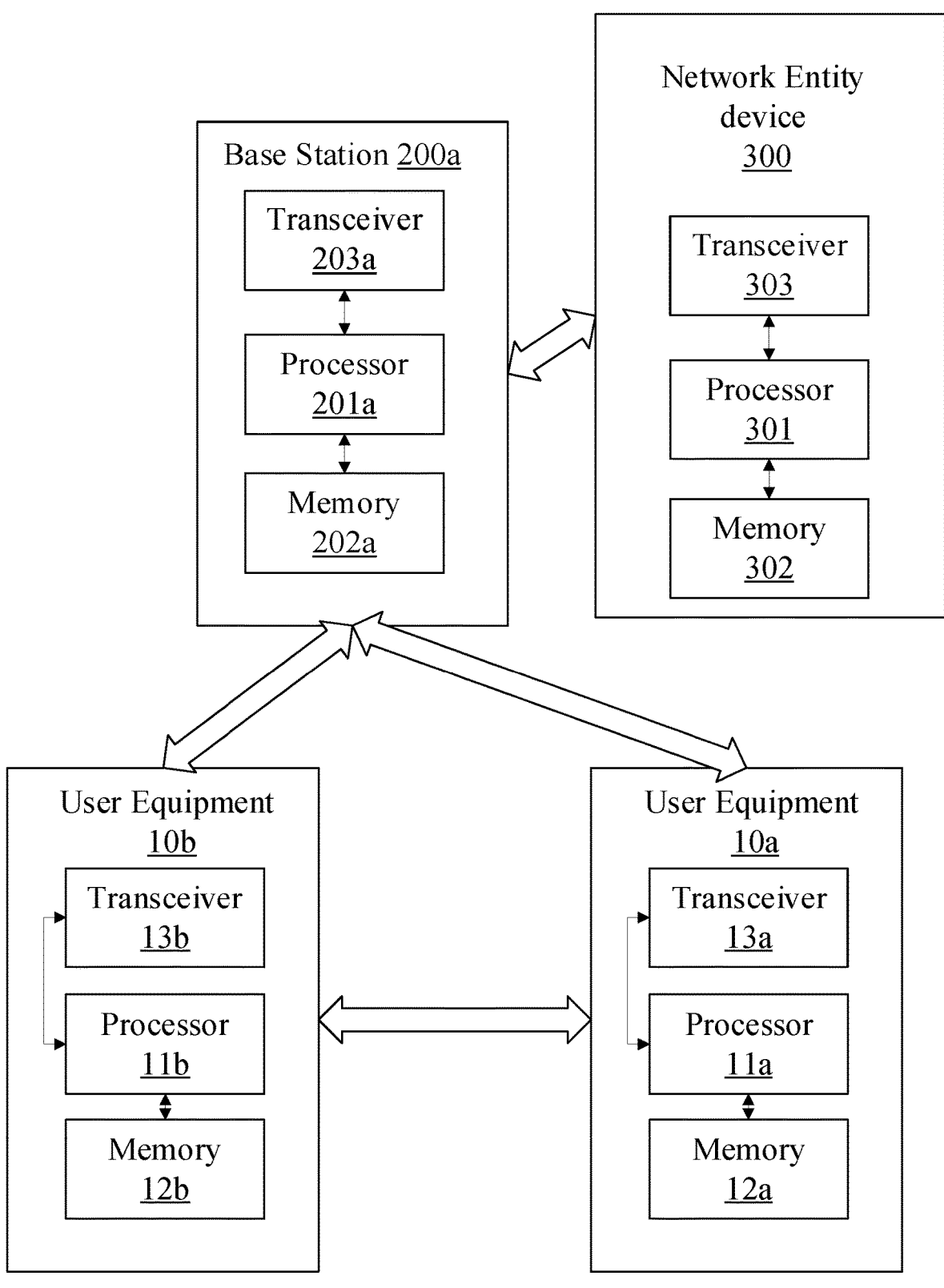
FIG. 1 illustrates a schematic view of a telecommunication system.

With reference to FIG. 1, a telecommunication system including a UE 10a, a UE 10b, a base station (BS) 200a, and a network entity device 300 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGs. The UE 10a may include a processor 11a, a memory 12a, and a transceiver 13a. The UE 10b may include a processor 11b, a memory 12b, and a transceiver 13b. The base station 200a may include a processor 201a, a memory 202a, and a transceiver 203a. The network entity device 300 may include a processor 301, a memory 302, and a transceiver 303. Each of the processors 11a, 11b, 201a, and 301 may be configured to implement proposed functions, procedures and/or methods described in the description. Layers of radio interface protocol may be implemented in the processors 11a, 11b, 201a, and 301. Each of the memory 12a, 12b, 202a, and 302 operatively stores a variety of programs and information to operate a connected processor. Each of the transceivers 13a, 13b, 203a, and 303 is operatively coupled with a connected processor, transmits and/or receives radio signals or wireline signals. The UE 10a may be in communication with the UE 10b through a sidelink. The base station 200a may be an eNB, a gNB, or one of other types of radio nodes, and may configure radio resources for the UE 10a and UE 10b.

Each of the processors 11a, 11b, 201a, and 301 may include application-specific integrated circuits (ASICs), other chipsets, logic circuits and/or data processing devices. Each of the memory 12a. 12b. 202a, and 302 may include read-only memory (ROM), a random access memory (RAM), a flash memory, a memory card, a storage medium and/or other storage devices. Each of the transceivers 13a, 13b, 203a, and 303 may include baseband circuitry and radio frequency (RF) circuitry to process radio frequency signals. When the embodiments are implemented in software, the techniques described herein can be implemented with modules, procedures, functions, entities and so on, that perform the functions described herein. The modules can be stored in a memory and executed by the processors. The memory can be implemented within a processor or external to the processor, in which those can be communicatively coupled to the processor via various means are known in the art.

The communication between UEs may be realized according to device to device (D2D) communication or vehicle-to-everything (V2X) communication. V2X communication includes vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface.

The network entity device 300 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Figure 2:
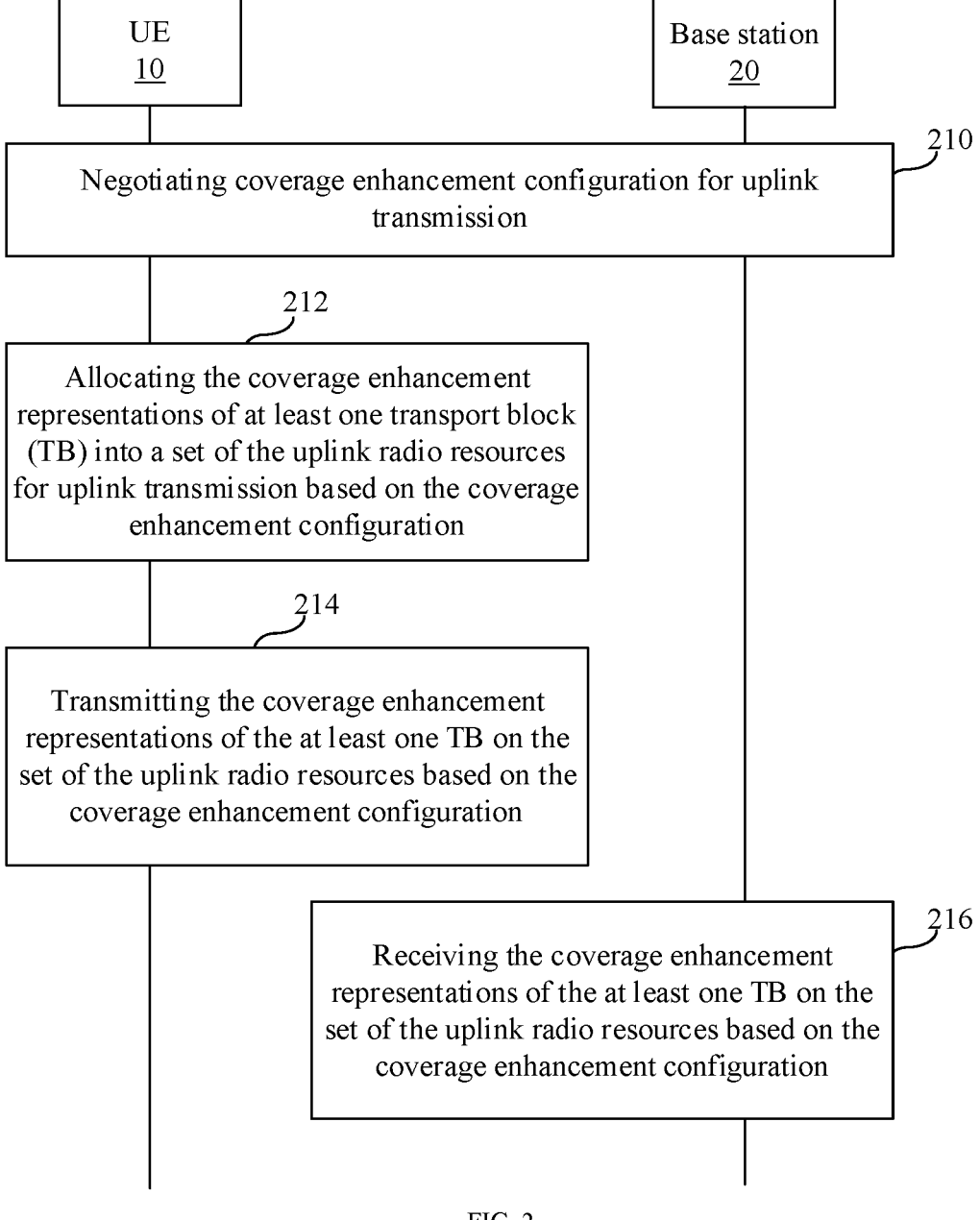
FIG. 2 illustrates a schematic view showing an uplink configuration method according to an embodiment of the invention.

With reference to FIG. 2, an example of a UE 10 in the description may include one of the UE 10a or UE 10b. An example of a base station 20 in the description may include the base station 200a. Uplink (UL) transmission of a control signal or data may be a transmission operation from a UE to a base station. Downlink (DL) transmission of a control signal or data may be a transmission operation from a base station to a UE.

The UE 10 execute the uplink configuration method. The UE 10 and base station 20 negotiates coverage enhancement configuration for uplink transmission (step 210)). The coverage enhancement configuration may be related to relates NR coverage enhancements. For example, in the negotiation of the overage enhancement configuration, the UE 10 may optionally provide UE capabilities of the UE 10 to the base station 20. The UE capabilities may comprise frequency hopping (FH) capability, bundling capability, time domain window (TDW), repetition type, or any combination thereof. The UE 10 allocates the coverage enhancement representations of at least one transport block (TB) into a set of the uplink radio resources for uplink transmission based on the coverage enhancement configuration (step 212). The coverage enhancement configuration comprises at least one or a combination of bundling configuration. TDW configuration, and frequency hopping configuration of the coverage enhancement representations. In an embodiment of the invention, the coverage enhancement representations of at least one transport block may comprise repetitions of one transport block. In an embodiment of the invention, the coverage enhancement representations of at least one transport block may comprise segments of one transport block in a transmission mode of one TB over multi-slot (TBoMS). In an embodiment of the invention, the coverage enhancement representations of at least one transport block may comprise a plurality of transport blocks scheduled by a message of uplink scheduling downlink control information (DCI).

In an embodiment of the invention, the frequency hopping configuration may comprise an indication for enabling or disabling of a frequency hopping function for the coverage enhancement representations of the at least one transport block. In an embodiment of the invention, the frequency hopping configuration may comprise an indication of a mode configuration of the frequency hopping function for the coverage enhancement representations of the at least one transport block. In an embodiment of the invention, the frequency hopping configuration may comprise both of the indication. Alternatively, the UE 10 may receive from the base station 20 a control signal carrying an indication for enabling or disabling of the frequency hopping function for the coverage enhancement representations of the at least one transport block. The mode configuration of the frequency hopping function comprises frequency hopping type indicating intra-slot frequency hopping or inter-slot frequency hopping.

In an embodiment of the invention, the bundling configuration of the coverage enhancement representations may comprise an indication for enabling or disabling of a bundling function for the coverage enhancement representations of the at least one transport block. In an embodiment of the invention, the bundling configuration of the coverage enhancement representations may comprise an indication of a mode configuration of the bundling function for the coverage enhancement representations of the at least one transport block. In an embodiment of the invention, the bundling configuration may comprise both of the indication. Alternatively, the UE 10 may receive from the base station 20 a control signal carrying an indication for enabling or disabling of a bundling function for the coverage enhancement representations of the at least one transport block. The bundling configuration of the coverage enhancement representations may be explicitly represented by a control signal or implicitly represented by the frequency hopping configuration.

In an embodiment of the invention, the TDW configuration of the coverage enhancement representations may comprise an indication for enabling or disabling of a TDW function for the coverage enhancement representations of the at least one transport block. In an embodiment of the invention, the TDW configuration of the coverage enhancement representations may comprise an indication of a mode configuration of the TDW function for the coverage enhancement representations of the at least one transport block. In an embodiment of the invention, the TDW configuration may comprise both of the indication. Alternatively, the UE 10 may receive from the base station 20 a control signal carrying an indication for enabling or disabling of a TDW function for the coverage enhancement representations of the at least one transport block. The TDW configuration of the coverage enhancement representations may be explicitly represented by a control signal or implicitly represented by the frequency hopping configuration. The control signals, the frequency hopping configuration, the TDW configuration, and/or the bundling configuration of the coverage enhancement representations may be included in a message of downlink control information (DCI), radio resource control (RRC), or configured grant (CG) configuration.

The UE 10 transmits the coverage enhancement representations of the at least one transport block on the set of the uplink radio resources to the base station 20 based on the coverage enhancement configuration (step 214). The base station 20 receives the coverage enhancement representations of the at least one transport block on the set of the uplink radio resources from the UE 10) based on the coverage enhancement configuration (step 216).

The key point for joint channel estimation is ensuring power consistency and phase continuity. Joint channel estimation is based on the conditions to keep power consistency and phase continuity. A UE can keep phase continuity cross PUCCH or PUSCH repetitions when following conditions are met:

Modulation order does not change.

RB allocation in terms of length and frequency position is not changed, and intra-slot and inter-slot frequency hopping is not enabled within a repetition bundle.

No change on transmission power level of its own component carrier (CC), i.e., no change on the power control parameters specified in TS 38.213, and also when own CC is not impacted by other concurrent CC(s) that are configured for inter-band carrier aggregation (CA) or dual connectivity (DC) for same UE with dynamic power sharing and no change in any configured CCs that are part of configured intra-band uplink CA or DC.

No UL beam switching for FR2 UE occurs.

For back-to-back transmissions with zero gap in-between adjacent transmissions, the aforementioned conditions need to be met to maintain phase continuity crossing the repetitions.

For non-back-to-back transmission with non-zero gap in-between adjacent transmissions, at least following additional condition also needs to be met in addition to the aforementioned conditions: No downlink reception in-between the PUSCH or PUCCH repetition in the same band for TDD case.

In a scenario of no more than X un-scheduled OFDM symbols in-between the PUSCH or PUCCH repetition (e.g., X=0, 1, 2, . . . , 14), and scenario of other physical signals/channels in-between PUCCH or PUSCH repetitions from the UE perspective, e.g., SRS or PUCCH transmission in-between the PUSCH repetition for the UE. X can be non-zero value and UE can maintain phase continuity.

If the conditions for phase continuity cross PUSCH or PUCCH repetitions are fulfilled, the same power level with certain tolerance level can also be achieved.

Frequency hopping changes the frequency resources and impacts the joint channel estimation. Bundling is introduced to balance between JCE gain and frequency diversity gain. Inter-bundle frequency hopping can be considered for coverage enhancements. The phase continuity within one bundle should be preserved. With inter-bundle hopping, cross-slot channel estimation can be enabled to improve the accuracy of channel estimation within one bundle. To support inter-bundle frequency hopping for NR, the frequency hopping pattern including a frequency domain hopping offset, a time domain hopping interval and the related signaling need to be defined and the phase continuity within one bundle should be preserved.

For TDD operation, joint channel estimation may be only performed among PUSCH transmissions in consecutive UL slots. Depending on TDD configuration and definition of one FH bundle, the inter-slot FH pattern may be different.

Bundling is usually across multiple slots, so only use cases that across multiple slots are considered. For PUSCH transmission across multiple slots, it may refer to four PUSCH types including:

PUSCH with repetition type A over multi-slot;

PUSCH with repetition type B over multi-slot;

PUSCH with different TBs over multi-slot; and

PUSCH with one TB over multi-slot (TBoMS PUSCH).

PUSCH with TBoMS is not yet determined whether to use PUSCH repetition type A like time domain resource allocation (TDRA) or PUSCH repetition type B like TDRA. The JCE for TBOMS has not yet been discussed.

Figure 3:
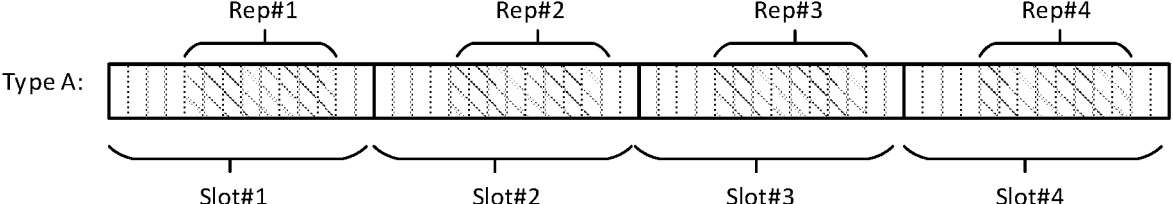
FIG. 3 illustrates a schematic view showing a PUSCH repetition type A and type B.
Figure 3:
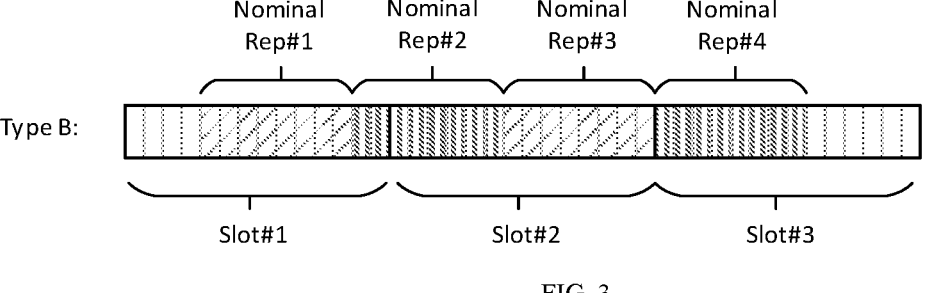

In 3GPP release 15, one PUSCH transmission instance is not allowed to cross the slot boundary for both dynamic grant (DG) and configured grant (CG) PUSCH. To avoid transmitting a long PUSCH across slot boundary, the UE can transmit small PUSCHs in several repetitions without feedback, scheduled by a UL grant or RRC in the consecutive available slots. This method is called PUSCH repetition Type A, in which each slot contains only one repetition and the time domain for the repetitions of a transport block is the same in those slots as shown in FIG. 3.

PUSCH repetition Type A causes a big time gap among the repetitions and makes the system unable to achieve URLLC latency requirement. Therefore, in Release 16, PUSCH repetition Type B in FIG. 3 is developed to eliminate time gaps among repetitions and ensures the configured number of repetitions in the time constraint because the repetitions are carried out in the consecutive sub-slots so one slot might contain more than one repetition of a transport block.

For PUSCH repetition Type B, the time domain resource is indicated by the gNB for the first "nominal" repetition while the resources for the remaining repetitions are derived based at least on the resources for the first repetition and UL/DL direction of symbols. If a "nominal" repetition goes across a split point, such as the slot boundary, invalid symbols, or DL/UL switching point, this "nominal" repetition is split at the split point into multiple PUSCH repetitions. Therefore, the actual number of repetitions can be larger than the nominal number.

In the uplink direction, two types of transmission without dynamic grant are known as configured grant Type 1 and configured grant Type 2. In the configured grant Type 1, an uplink grant is provided by RRC, such as information element (IE) ConfiguredGrantConfig including rrcConfiguredUplinkGrant. In the configured grant Type 2, an uplink grant is provided by an RRC signal, such as IE ConfiguredGrantConfig not including rrcConfiguredUplinkGrant, and activated/deactivated by PDCCH. In ConfiguredGrantConfig, the repK and repK-RV are also included.

PUSCH repetition type A can support inter-slot frequency hopping (FH).

If PUSCH scheduled by DCI 0_2, an FH type is indicated by the higher layer parameter "frequencyHopping-ForDCIFormat0_2" in IE pusch-Config, and FH is enabled by the field "Frequency hopping flag" in DCI 0_2.

If PUSCH scheduled by DCI but not DCI 0_2, FH type is indicated by the higher layer parameter "frequency Hopping" in IE pusch-Config, and FH is enabled by the field "Frequency hopping flag" in DCI.

If PUSCH scheduled by the configured Grant type 1. FH type is indicated and FH is enabled by the same higher layer parameter "frequency Hopping" in IE ConfigredGrantConfig.

If PUSCH is scheduled by the configured Grant type 2 and DCI. FH type is indicated by higher layer parameter is "frequency Hopping" in IE ConfigredGrantConfig, and FH is enabled by the field "Frequency hopping flag" in DCI 0_0 or DCI 0_1.

PUSCH repetition type B can support inter-slot and inter-repetition frequency hopping.

If PUSCH is scheduled by DCI 0_2, FH type is indicated by the higher layer parameter "frequencyHopping-ForDCIFormat0_2" in IE pusch-Config, and FH is enabled by the field "Frequency hopping flag" in DCI 0_2.

If PUSCH is scheduled by DCI 0_1. FH type is indicated by the higher layer parameter "frequencyHopping-ForDCIFormat0_1" in IE pusch-Config, and FH is enabled by the field "Frequency hopping flag" in DCI 0_1.

If PUSCH is scheduled by the configured Grant type 1, FH type is indicated and FH is enabled by the same higher layer parameter "frequencyHoppingPUSCH-RepTypeB" in IE ConfigredGrantConfig.

If PUSCH is scheduled by the configured Grant type 2, the FH type follows the configuration of the activating DCI format.

PUSCH with Repetition Type A and PUSCH with Repetition Type B:

In an embodiment of the invention, the coverage enhancement representations of the at least one transport block comprise repetitions of one transport block. The coverage enhancement configuration comprises repetition type of the repetitions of the transport block, the repetition type comprises an indication of a repetition type A or a repetition type B of the repetitions of the transport block. In the repetition type A, two adjacent repetitions in the repetitions of the transport block are separately allocated to two slots. In the repetition type B, two adjacent nominal repetitions in the repetitions of the transport block are back-to-back allocated to one or more adjacent slots. The frequency hopping (FH) type of the frequency hopping function indicates one of the intra-slot FH or inter-slot FH applicable to the repetition type A, one of inter-slot FH or inter-repetition FH applicable to the repetition type B.

Bundling Associated with FH:

The mode configuration of the frequency hopping function comprises frequency hopping type indicating intra-slot frequency hopping or inter-slot frequency hopping. The mode configuration of the bundling function comprises one or both of a bundling type and a bundling size, the bundling type indicates inter-slot bundling or inter-repetition bundling, and the bundling size indicates a number of slots for the inter-slot bundling or a number of repetitions for the inter-repetition bundling.

For bundling associated with FH, the possible combinations of FH and bundling are shown in the following Table 1. If FH type is intra-slot for PUSCH repetition type A, bundling is not supported. The bundling size is not greater than half of the number of repetitions.

TABLE 1

| | PUSCH repetition Type A | | PUSCH repetition Type B | |
|---|---|---|---|---|
| | Intra-slot FH | Inter-slot FH | Inter-slot FH | Inter-repetition FH |
| Inter-slot bundling | X | Case 1 | Case 3 | X |
| Inter-repetition bundling | X | Case 2 | X | Case 4 |

Table 1 shows combinations of FH and bundling for PUSCH repetition type A/B.

Figure 4:
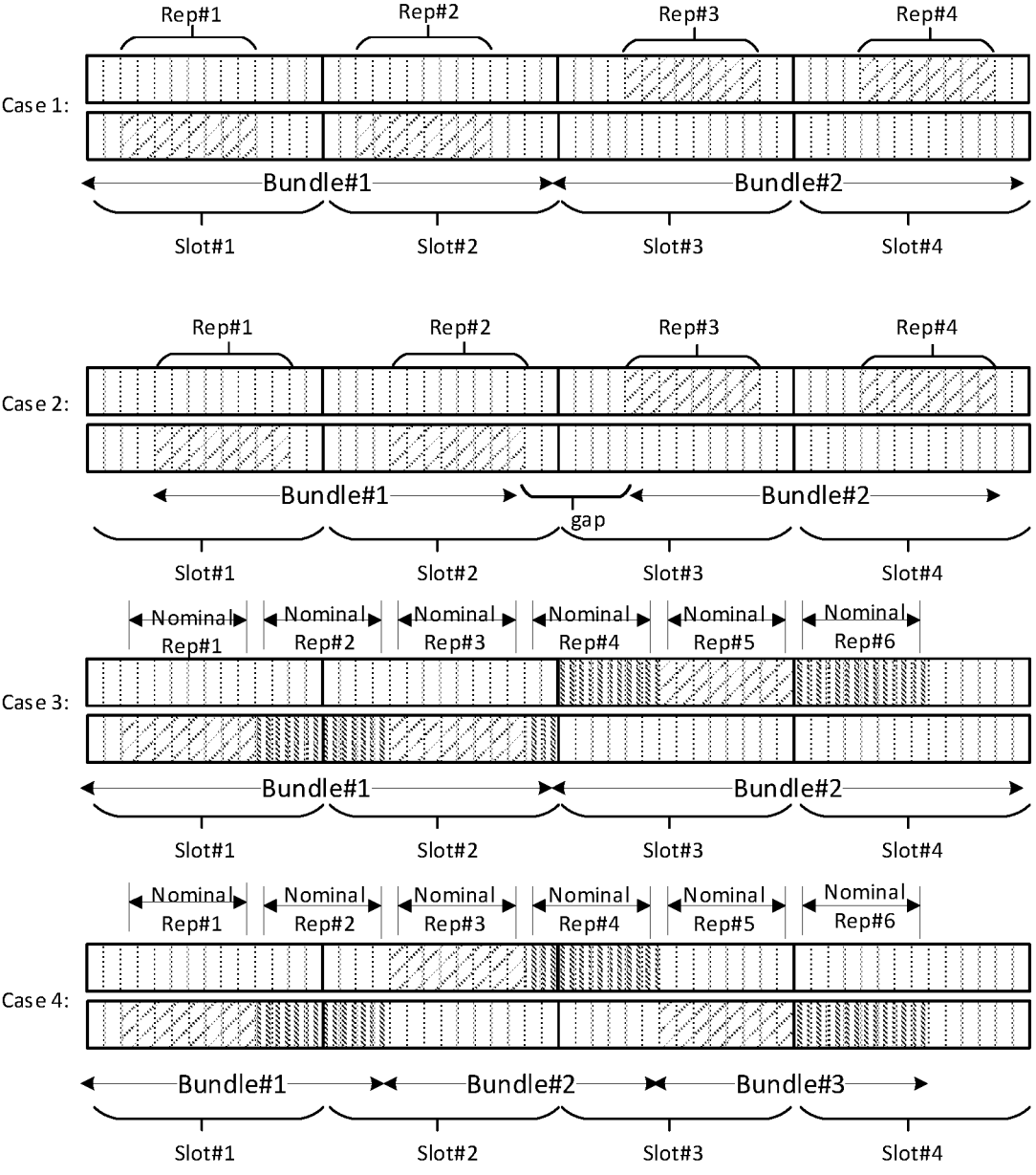
FIG. 4 illustrates a schematic view showing cases 1 to 4 of uplink configuration.

With reference to FIG. 4. Case 1 shows PUSCH repetition Type A with inter-slot bundling. Case 2 shows PUSCH repetition Type A with inter-slot FH and with inter-repetition bundling. Case 3 is an example of PUSCH repetition Type B over multiple slots with inter-slot FH and with inter-slot bundling. Case 4 is an example of PUSCH repetition Type B over multiple slots with inter-repetition FH and with inter-repetition bundling.

In case 2, the bundling is between repetitions for PUSCH repetition type A. PUSCH repetition type A is an example of non-back-to-back UL transmission. During the gap between bundles, the UE 10 can perform DL reception for TDD case or UL transmission for TDD/FDD case. In this case. The UE 10 can get a JCE gain, frequency diversity gain and improve resource utilization.

In case 1/3/4, the UE 10 can balance between JCE gain and diversity gain.

If case 2 is not supported, it is obvious that the bundling type is the same as its FH type, so the bundling type can be indicated implicitly by the FH type. An explicit indication of the bundling type is not excluded. The bundling size should be configured by higher layer parameter (e.g. PUSCH configuration or configured UL grant) or a DCI (e.g. DCI 0_x) field explicitly or implicitly. The unit of a bundling size is related to the FH type. For example, a fieldbundleSize of the bundling size indicates a number of slots for the inter-slot bundling or a number of repetitions for the inter-repetition bundling. The frequencyHoppingDCI-0-2, PUSCH-Config, and ConfiguredGrantConfig are messages of DCI, PUSCH configuration, and CG configuration respectively.

TABLE 2

```
frequencyHoppingDCI-0-2 CHOICE {
    pusch-RepTypeA ENUMERATED {intraSlot, interSlot},
    pusch-RepTypeB ENUMERATED {interRepetition, interSlot}
    bundleSize INTER(1...x)
}
```

TABLE 3

```
PUSCH-Config ::= SEQUENCE {
    ....
    frequencyHopping ENUMERATED {intraSlot, interSlot}
    OPTIONAL, -- Need S /*For R15
RepTypeA*/
    .....
    pusch-RepTypeIndicatorDCI-0-1 ENUMERATED
    { pusch-RepTypeA, pusch-RepTypeB}
    OPTIONAL,
        frequencyHoppingDCI-0-1 ENUMERATED {interRepetition,
        interSlot} OPTIONAL, -- Cond
RepTypeB
        bundleSize INTER(1...x)
        ....
}
```

TABLE 4

```
ConfiguredGrantConfig ::= SEQUENCE {
    frequencyHopping ENUMERATED {intraSlot, interSlot}
    OPTIONAL, -- Need S   //R15 RepTypeA
    ....
    rrc-ConfiguredUplinkGrant SEQUENCE {
        ...,
        [[
        ....
        pusch-RepTypeIndicator-r16  ENUMERATED
        {pusch-RepTypeA,pusch-RepTypeB}
OPTIONAL
        frequencyHoppingPUSCH-RepTypeB-r16  ENUMERATED
        {interRepetition, interSlot}
OPTIONAL,
        ]]
        } OPTIONAL, -- Need   //CG Type 1
    ...
    bundleSize INTER(1...x)
    .....
}
```

If Cases1-4 are Supported:

Option1: An explicit bundling type indication and a bundling size should be respectively configured by a higher layer parameter (e.g. PUSCH configuration or configured UL grant) or a DCI (e.g. DCI 0_x) field. A unit of a bundling size is related to the bundling type. These configurations are applicable to PUSCH repetition type A and type B. For example, a field bundling-type of the bundling type indicates inter-slot bundling or inter-repetition bundling. The frequencyHoppingDCI-0-2, PUSCH-Config, and ConfiguredGrant-Config are messages of DCI, PUSCH configuration, and CG configuration respectively.

Option2: only the PUSCH repetition type A needs a higher layer parameter or a DCI field to explicitly indicate the bundling type, and the PUSCH repetition type B can be indicated implicitly by its FH type. Of course, the bundling size may be configured by a higher layer parameter (e.g. PUSCH configuration or configured UL grant) or a DCI (e.g. DCI 0_x) field, and the unit is associated with the FH type. For example, mcs-TableList is a list of multiple options of MCS. The frequencyHoppingDCI-0-2, PUSCH-Config, and ConfiguredGrantConfig are messages of DCI, PUSCH configuration, and CG configuration respectively.

TABLE 5

```
frequencyHoppingDCI-0-2 CHOICE {
    pusch-RepTypeA ENUMERATED {intraSlot, interSlot},
    pusch-RepTypeB ENUMERATED {interRepetition, interSlot}
    bundling-type ENUMERATED {interRepetition, interSlot}   // for RepTypeA and RepTypeB
        bundleSize INTER(1...x)                                                    // for
RepTypeA and RepTypeB
}
```

TABLE 6

```
PUSCH-Config ::= SEQUENCE {
    ....
    frequencyHopping ENUMERATED {intraSlot, interSlot} OPTIONAL, -- Need S /*For R15
RepTypeA*/
    .....
    pusch-RepTypeIndicatorDCI-0-1 ENUMERATED { pusch-RepTypeA, pusch-RepTypeB}
OPTIONAL,
    frequencyHoppingDCI-0-1   ENUMERATED {interRepetition, interSlot} OPTIONAL, -- Cond
RepTypeB
    bundling-type ENUMERATED {interRepetition, interSlot}   // for RepTypeA and RepTypeB
        bundle-size INTER(1...x)                                                   // for
RepTypeA and RepTypeB
    ....
}
```

TABLE 7

```
ConfiguredGrantConfig ::= SEQUENCE {
    frequencyHopping ENUMERATED {intraSlot, interSlot} OPTIONAL, -- Need S   //R15 RepTypeA
    ....
    rrc-ConfiguredUplinkGrant SEQUENCE {
        ...,
        [[
            ....
            pusch-RepTypeIndicator-r16   ENUMERATED   {pusch-RepTypeA,pusch-RepTypeB}
OPTIONAL
            frequencyHoppingPUSCH-RepTypeB-r16 ENUMERATED {interRepetition, interSlot}
OPTIONAL,
        ]]
        } OPTIONAL, -- Need   //CG Type 1
        ...
        Bundle-type {interRepetition, interSlot}                // for RepTypeA and RepTypeB
        bundle-size INTER(1...x)                                // for RepTypeA and RepTypeB
        .....
}
```

TABLE 8

```
frequencyHoppingDCI-0-2 CHOICE {
    pusch-RepTypeA ENUMERATED {intraSlot, interSlot},
    pusch-RepTypeB ENUMERATED {interRepetition, interSlot}
    bundlingType ENUMERATED {interRepetition, interSlot}   //Cond RepTypeA
        bundleSize INTER(1...x)                                           // for
RepTypeA and RepTypeB
    mcs-TableList   .....   // PUSCH have multi-mcs options to be used for different bundle.....
}
```

TABLE 9

```
PUSCH-Config ::= SEQUENCE {
    ....
    frequencyHopping ENUMERATED {intraSlot, interSlot} OPTIONAL, -- Need S /*For R15
RepTypeA*/
    .....
    pusch-RepTypeIndicatorDCI-0-1   ENUMERATED { pusch-RepTypeA, pusch-RepTypeB}
OPTIONAL,
    frequencyHoppingDCI-0-1   ENUMERATED {interRepetition, interSlot} OPTIONAL, -- Cond
RepTypeB
    bundlingType ENUMERATED {interRepetition, interSlot}   // Cond RepTypeA
        bundleSize INTER(1...x)                                           // for
RepTypeA and RepTypeB
    mcs-TableList   .....   // PUSCH have multi-mcs options to be used for different bundle.....
}
```

TABLE 10

```
ConfiguredGrantConfig ::= SEQUENCE {
    frequencyHopping ENUMERATED {intraSlot, interSlot} OPTIONAL, -- Need S   //R15 RepTypeA
    ....
    rrc-ConfiguredUplinkGrant SEQUENCE {
        ...,
        [[
        ....
        pusch-RepTypeIndicator-r16   ENUMERATED   {pusch-RepTypeA,pusch-RepTypeB}
OPTIONAL
        frequencyHoppingPUSCH-RepTypeB-r16 ENUMERATED {interRepetition, interSlot}
OPTIONAL,
        ]]
        } OPTIONAL, -- Need   //CG Type 1
        ...
        BundleType {interRepetition, interSlot}                 //   RepTypeA
        bundleSize INTER(1...x)                                  // for RepTypeA and RepTypeB
        mcs-TableList   .....   // PUSCH have multi-mcs options to be used for different bundle.....
}
```

In case 3, the bundles are not consecutive in time domain. In the time gap between bundles, the UE 10 can transmit PUSCH of different phases or power.

Bundling Separated with FH

For bundling separated with FH, the possible combinations of bundling and repetition are shown in the following Table 11.

TABLE 11

| | PUSCH repetition Type A | | | PUSCH repetition Type B | | |
|---|---|---|---|---|---|---|
| | without FH | Intra-slot FH | Inter-slot FH | without FH | Inter-slot FH | Inter-repetition FH |
| Inter-slot bundling | Case 5 | X | Case 1 | Case 7 | Case 3 | X |

TABLE 11-continued

| | PUSCH repetition Type A | | | PUSCH repetition Type B | | |
|---|---|---|---|---|---|---|
| | without FH | Intra-slot FH | Inter-slot FH | without FH | Inter-slot FH | Inter-repetition FH |
| Inter-repetition bundling | Case 6 | X | Case 2 | Case 8 | X | Case 4 |

Figure 5:
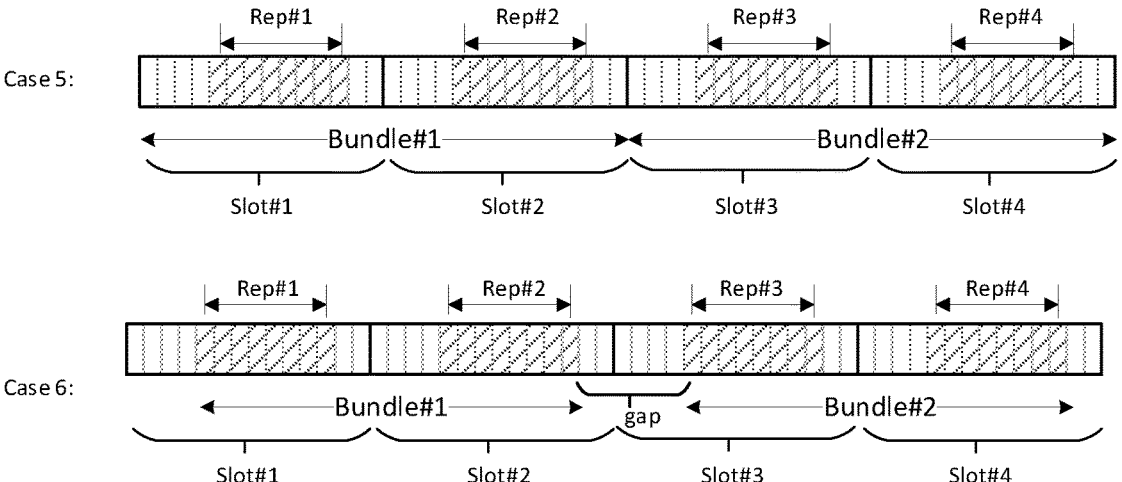
FIG. 5 illustrates a schematic view showing cases 5 to 8 of uplink configuration.
Figure 5:
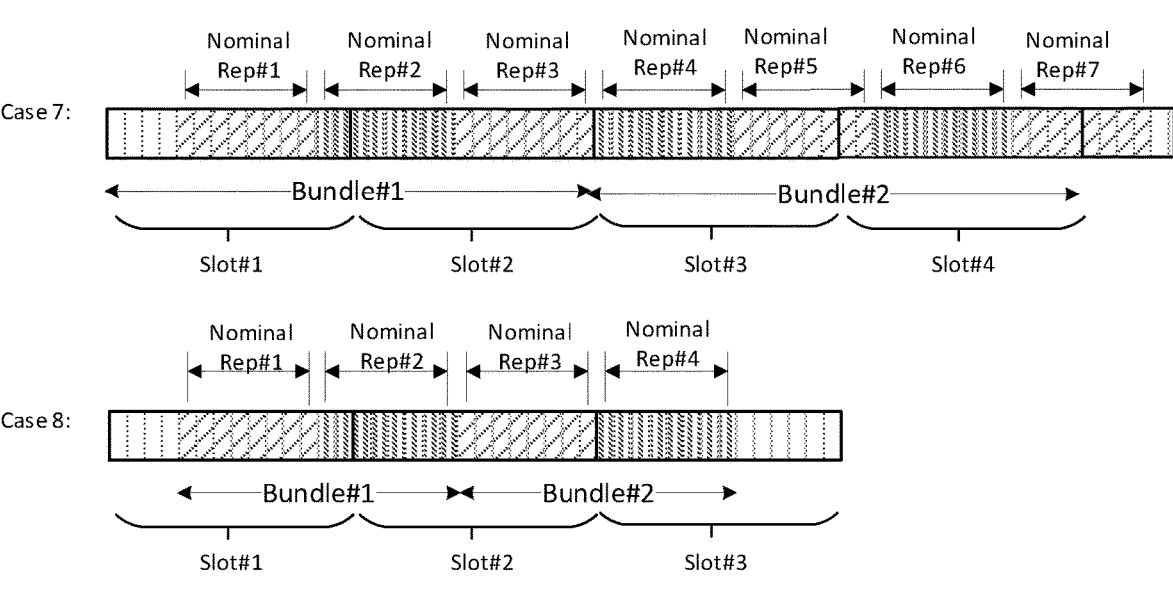

Table 11 shows possible bundling combinations for PUSCH repetition type A/B. With reference to FIG. 5, Case 5 is an example of PUSCH repetition Type A with inter-slot FH and without inter-slot bundling. Case 6 is an example of PUSCH repetition Type A with inter-slot FH and without inter-repetition bundling. Case 7 is an example of PUSCH repetition Type B over multiple slots without inter-slot FH and with inter-slot bundling. Case 8 is an example of PUSCH repetition Type B over multiple slots without inter-slot FH and with inter-repetition bundling.

In case 6, the bundling is between repetitions for PUSCH repetition type A (non-back-to-back UL transmission). During the gap between bundles, the UE 10 can perform DL reception for a TDD case or UL transmission for a TDD/FDD case. In this case, the UE 10 can get a JCE gain and improve resource utilization.

In case 5/7/8, the UE 10 get a JCE gain while using different modulation and coding schemes (MCSs), transmission power levels, or UL beam configuration on FR2 for each bundle for adapting to the change of wireless environments.

From the Table 11, it is obvious that the bundling type cannot be implicitly indicated by FH type, and a separate, indication is required which can be an explicit or implicit higher layer parameter or DCI field. The bundling size may also be configured by a higher layer parameter (e.g. PUSCH configuration or configured UL grant) or a DCI (e.g. DCI 0_x) field explicitly or implicitly. For MCS and transmission power levels, the configuration of PUSCH and the UL grant may provide multiple options to different bundles. For example, a field bundleTypeIndicator of the bundling type indicates inter-slot bundling or inter-repetition bundling.

TABLE 12

```
PUSCH-Config ::= SEQUENCE {
    ....
    mcs-TableList    .....    // PUSCH have multi-mcs options to be used for different bundle
    //Both without FH and with FH for RepTypeA and RepType B
    bundleTypeIndicator ENUMERATED {interSlot, interRepetition}
    bundleSize INTER(1...x)
    ....
}
```

TABLE 13

```
ConfiguredGrantConfig ::= SEQUENCE {
    ....
    mcs-TableList    .....    // PUSCH have multi-mcs options to be used for different bundle
    //Both without FH and with FH for RepTypeA and RepType B
    bundleTypeIndicator ENUMERATED {interSlot, interRepetition}
    bundleSize INTER(1...x)
        ....
}
```

For PUSCH repetition, the bundle size is not be greater than half of the repetition number.

Procedure:

The base station 20 provides indications explicitly or implicitly to the UE 10 to enable and disable the bundling function. The bundling function runs through the PUSCH transmission. For PUSCH scheduled by DCI or CG Type 2, the value of "Frequency hopping flag" in DCI is used to enable/disable both FH operation and bundling operation, if bundling is associated with FH. For example, a value "1" of "Frequency hopping flag" in DCI may represent and triggers enabling of the bundling function, and a value "0" of "Frequency hopping flag" in DCI may represent and triggers disabling of the bundling function.

For PUSCH scheduled by DCI or CG Type 1/2, a new field in DCI indicates to enable/disable bundling operation. For example, the bundling flag can be 0 or 1 bit. The bundling flag is 0 bit if the higher layer parameters provide the bundling configuration. The bundling flag is 1 bit if the higher layer parameters does not provide the bundling configuration For example, a value "1" of the new field bundling flag in DCI may represent and triggers enabling of the bundling function, and a value "0" of a new field bundling flag in DCI may represent and triggers disabling of the bundling function.

A new field (e.g. bundleK) in PUSCH configuration or CG configuration represents an upper limit of bundles in the bundling function. The new field of the upper limit of bundles, such as bundleK, may be included in the bundling configuration and indicate the number of bundles. If bundles of the bundling function reached bundleK, the UE 10 stops bundling operations in the bundling function.

TABLE 14

```
PUSCH-Config ::= SEQUENCE {
    .....
    bundlingType ENUMERATED {interRepetition, interSlot}
    bundleSize INTER(1...x)
    bundleK    INTER(1...x)
    ....
}
```

Figure 6:
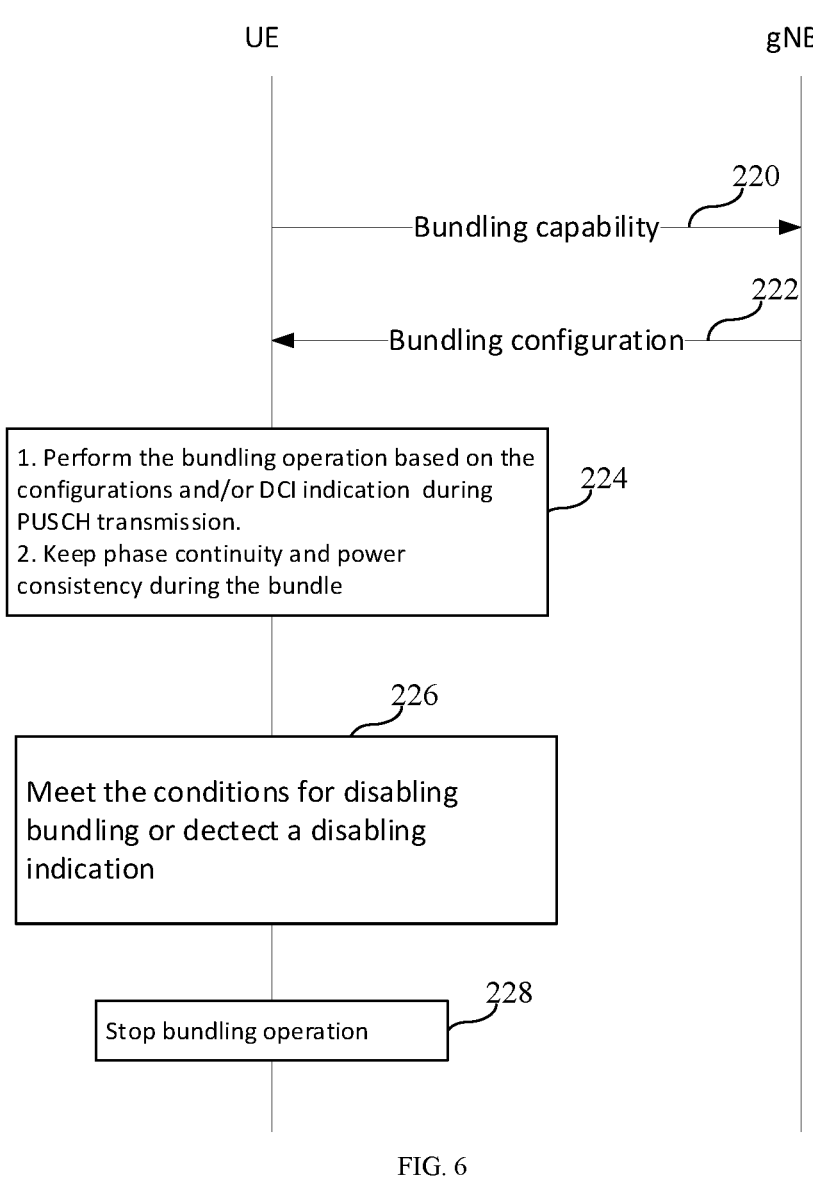
FIG. 6 illustrates a schematic view showing an example of disabling a bundling function in multi-PUSCH scheduling.

With reference to FIG. 6, the UE 10 disables bundling operations in the bundling function when detecting a disabling indication or an event that the bundles of the bundling function reach the upper limit.

In an embodiment of the invention, the UE 10 may optionally indicate or reports its bundling capability explicitly or implicitly via a UE capability report. Msg1, Msg A, and/or Msg 3 (step 220).

The base station 20 provides the bundling configurations in an RRC signal, a message of configured UL grant configuration, or DCI to the UE 10 (step 222).

If the UE 10 determines the bundling function is enabled, the UE 10 allocates the frequency resources of PUSCH within a bundle, and keeps phase continuity and power consistency with a certain tolerance level during the bundle. The UE 10 1 performs the bundling operation based on the configurations and/or DCI indication during PUSCH transmission and keeps phase continuity and power consistency during the bundle (step 224).

When a non-zero gap is between two consecutive bundles in the bundling function, the UE 10, during the gap, can perform DL reception in a TDD case or UL transmission with a different phase and/or a different power level in TDD and FDD case. UL transmission with a different phase may be UL transmission with a different MCS or different frequency resources.

If the UE 10 detects a disable indication from DCI or RRC signaling, or bundleK bundles have been executed, or the end of the PUSCH transmission (step 226), the UE 10 should stop the bundling operation (step 228).

Figure 7:
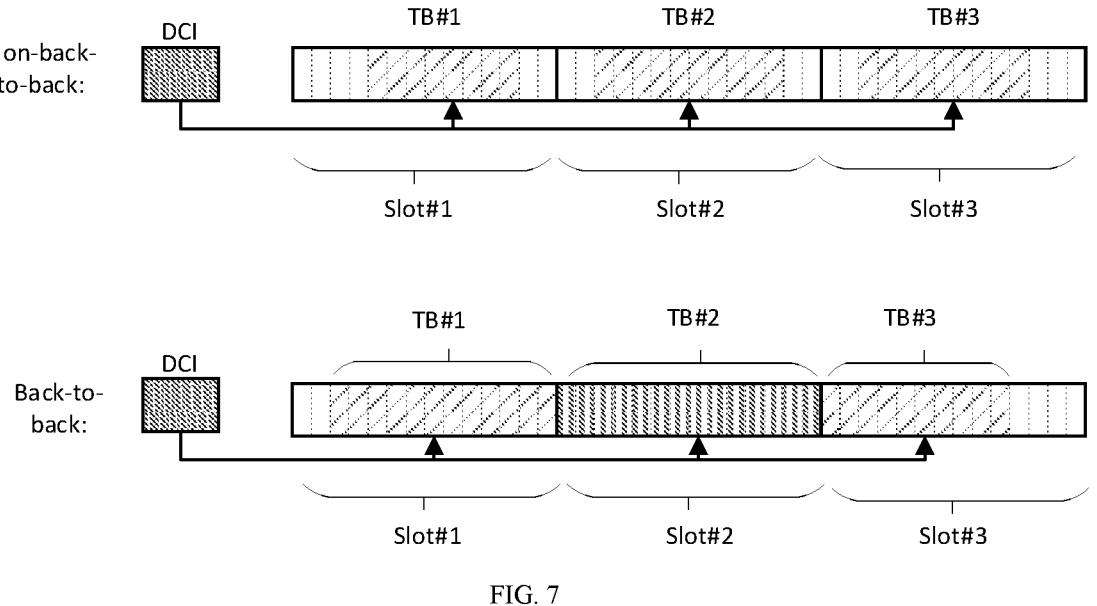
FIG. 7 illustrates a schematic view showing an example of multi-PUSCH scheduling.

Different PUSCHs Over Multiple Slots:

The coverage enhancement representations of the at least one transport block comprise a plurality of transport blocks scheduled by a message of uplink scheduling downlink control information (DCI). FIG. 7 shows an example of multi-PUSCH scheduling where a DCI message schedules a plurality of PUSCHs, such as TB #1, TB #2, and TB #3.

In Rel. 15, a DCI schedules a PUSCH. In Rel.16, multiple PUSCHs can be scheduled by a DCI 0_1. The new data indication (NDI) field in DCI 0_1 consists of multiple bits. In this case, the number of bits of the NDI field is equal to the maximum number of schedulable PUSCHs among all entries in the higher layer parameter pusch-TimeDomain-AllocationList in pusch-configuration, where each bit corresponds to one scheduled PUSCH.

Figure 8:
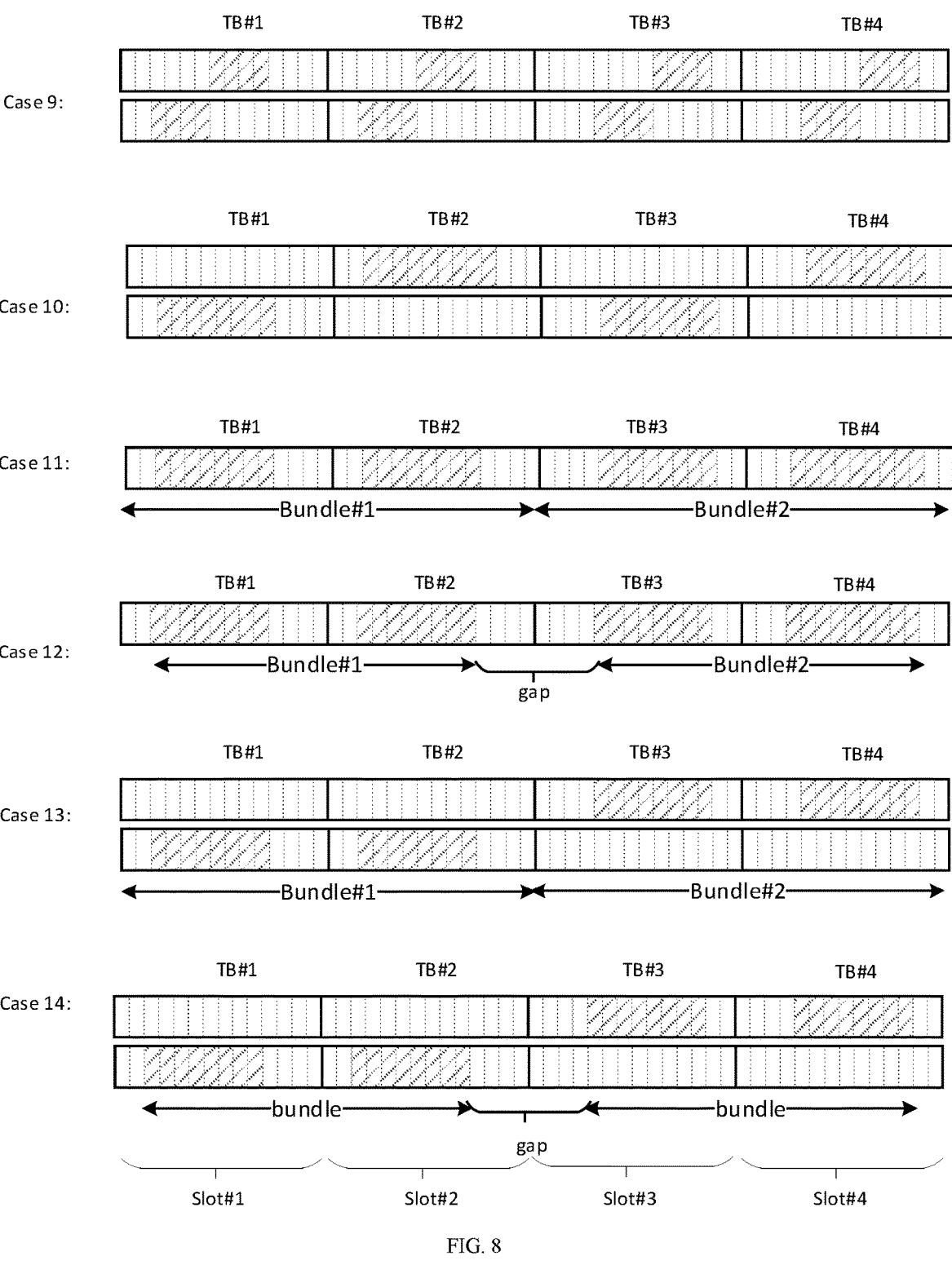
FIG. 8 illustrates a schematic view showing cases 10 to 14 of uplink configuration.

With reference to FIG. 8, Case 9 is an example of multi-PUSCH scheduling without bundling and with intra-slot FH. Case 10 is an example of multi-PUSCH scheduling without bundling and with inter-slot FH.

To get frequency diversity gain, multi-PUSCH scheduling may support frequency hopping, such as shown in Case 9 and Case 10. Intra-slot and inter-slot frequency hopping may be supported. For the frequency hopping offset, it can reuse the parameter frequency HoppingOffsetLists in PUSCH configuration, or a new parameter dedicated to multi-PUSCH scheduling. For example, the mode configuration of the frequency hopping function comprises frequency hopping type indicating intra-slot frequency hopping or inter-slot frequency hopping. The type of frequency hopping or FH type, such as frequencyHopping-multiPusch, indicates intra-slot frequency hopping or inter-slot frequency hopping. A parameter frequencyHoppingOffsetListFormulti-Pusch provides a frequency hopping offset.

The mode configuration of the bundling function comprises one or both of a bundling type and a bundling size. The bundling type indicates inter-slot bundling or inter-TB bundling. The bundling size indicates a number of slots for the inter-slot bundling or a number of TBs for the inter-TB bundling. The possible combinations of bundling are shown in the following Table 16.

TABLE 16

| | Multi-PUSCH scheduling | | |
| --- | --- | --- | --- |
| | without FH | Intra-slot FH | Inter-slot FH |
| Inter-slot bundling | Case 11 | X | Case 13 |
| Inter-TB bundling | Case 12 | X | Case 14 |

Table 16 shows possible bundling combinations for multi-PUSCH scheduling.

With reference to FIG. 8, Case 11 is an example of multi-PUSCH scheduling with inter-slot bundling and without FH. Case 12 is an example of multi-PUSCH scheduling with inter-TB bundling and without FH. Case 13 is an example of multi-PUSCH scheduling with inter-slot bundling and with inter-slot FH. Case 14 is an example of multi-PUSCH scheduling with inter-PUSCH bundling and with inter-slot FH.

In case 12 and case 14, the bundling is between PUSCHs (non-back-to-back UL transmission). During the gap between bundles, the UE 10 can perform DL reception for a TDD case or UL transmission for a TDD/FDD case. In this case, the UE 10 can get a JCE gain and improve resource utilization.

In case 11 and case 13, the UE 10 get a JCE gain while using a different MCS, a different transmission power level, or a different UL beam on FR2 for each bundle for adapting to the change of wireless environments.

The bundling type and the bundling size can be indicated implicitly or explicitly by a higher layer parameter (e.g. PUSCH configuration) or a DCI field. For example, a field frequency Hopping-multiPusch of FH type indicates intra-slot frequency hopping or inter-slot frequency hopping. A parameter frequencyHoppingOffsetListFormultiPusch pro-

TABLE 15

```
PUSCH-Config ::= SEQUENCE {
    ....
    pusch-TimeDomainAllocationListForMultiPUSCH    SetupRelease  {  PUSCH-
TimeDomainResourceAllocationList}
    frequencyHopping-multiPusch   ENUMERATED {intraSlot, interSlot}
    frequencyHoppingOffsetListFormultiPusch
    ....
}
```

In DCI 0_1, for, if the higher layer parameter that indicates the frequency hopping of multi-PUSCHs is configured, the field of the frequency hopping flag is not 0 bit. The field of the frequency hopping flag may indicate enable/disable frequency hopping.

vides a frequency hopping offset. The bundling type, such as bundleType, indicates inter-slot bundling or inter-TB bundling. The bundling size, such as bundleSize, indicates a number of slots for the inter-slot bundling or a number of TBs for the inter-TB bundling.

TABLE 17

```
PUSCH-Config ::= SEQUENCE {
    ....
    pusch-TimeDomainAllocationListForMultiPUSCH    SetupRelease    {    PUSCH-
TimeDomainResourceAllocationList}
    frequencyHopping-multiPusch    ENUMERATED {intraSlot, interSlot}
    frequencyHoppingOffsetListFormultiPusch    SEQUENCE (SIZE (1..4)) OF INTEGER (1..
maxNrofPhysicalResourceBlocks-1)
    bundleType ENUMERATED {interSlot, interPusch}
    bundleSize    INTER(1...x)
    ....
}
```

If support case 12 and case 14 which the UE 10 can use a different MCS and/or a different power level during the bundle gap, the configuration of PUSCH may provide multiple options of MCS and power levels to different bundles. For example, mcs-TableList is a list of multiple options of MCS.

TABLE 18

```
PUSCH-Config ::= SEQUENCE {
    ....
    mcs-TableList        .....  // PUSCH have multi-mcs options to be
                        used for different bundle
}
```

The bundling function is similar aforementioned embodiments, but configuration parameters are determined based on the contents described in this embodiment.

The coverage enhancement configuration may comprise time domain resource allocation (TDRA) configuration of the plurality of transport blocks. The TDRA configuration may comprise an indication of non-back-to-back TDRA or back-to-back TDRA of the plurality of transport blocks. In the non-back-to-back TDRA, two adjacent TBs in the plurality of transport blocks are separately allocated to two slots. In the back-to-back TDRA, two adjacent TBs in the plurality of transport blocks are back-to-back allocated to one or more adjacent slots. The frequency hopping (FH) type of the frequency hopping function indicates one of the intra-slot FH or the inter-slot FH applicable to the non-back-to-back TDRA, one of the inter-slot FH or the intra-slot FH applicable to the back-to-back TDRA.

The bundling configuration of the coverage enhancement representations comprises one or more of:

an indication for enabling or disabling of a bundling function for the coverage enhancement representations of the at least one transport block; and an indication of a mode configuration of the bundling function for the coverage enhancement representations of the at least one transport block.

The mode configuration of the bundling function comprises one or both of a bundling type and a bundling size, the bundling type indicates inter-slot bundling or inter-TB bundling, and the bundling size indicates a number of slots for the inter-slot bundling or a number of TBs for the inter-TB bundling. The bundling configuration of the coverage enhancement representations is included in a message of downlink control information (DCI), radio resource control (RRC), or configured grant (CG) configuration.

The bundling configuration comprises a list of modulation and coding schemes for bundles of the coverage enhancement representations. When a non-zero gap is between two consecutive bundles in the bundling function, the UE, during the gap, performs downlink reception or uplink transmission with a different phase or a different power level.

TBoMS PUSCH

The coverage enhancement representations of the at least one transport block comprise segments of one transport block in a transmission mode of one TB over multi-slot (TBoMS). The coverage enhancement configuration comprises time domain resource allocation (TDRA) configuration of the segments of the transport block. The TDRA configuration comprises an indication of non-back-to-back TDRA or back-to-back TDRA of the segments of the transport block.

Figure 9:
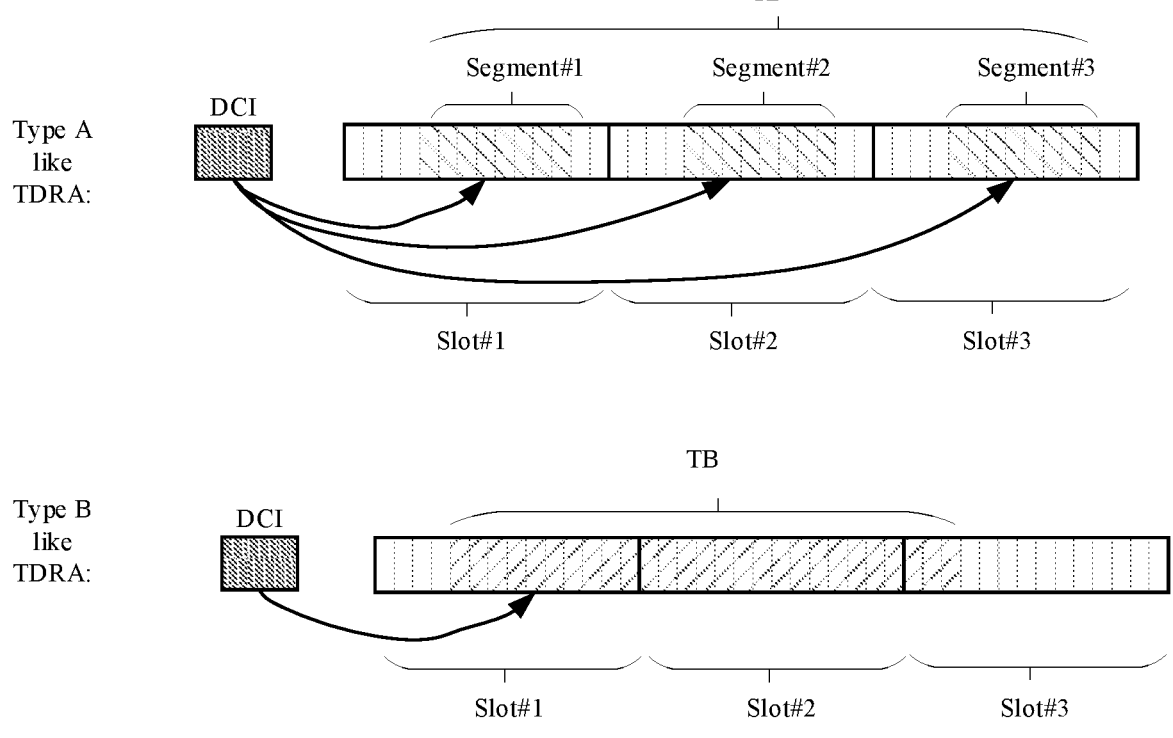
FIG. 9 illustrates a schematic view showing an example of TB over multi-slot (TBoMS) PUSCH.

In the non-back-to-back TDRA, two adjacent segments in the segments of the transport block are separately allocated to two slots. In the back-to-back TDRA, transmission of the transport block is back-to-back allocated to one or more adjacent slots. In other words, two adjacent segments in the segments of the transport block are back-to-back allocated to one or more adjacent slots. The frequency hopping (FH) type of the frequency hopping function indicates one of the intra-slot FH or the inter-slot FH applicable to the non-back-to-back TDRA or indicates one of the intra-slot FH or the inter-slot FH applicable to the back-to-back TDRA. FIG. 9 shows an example of TB over multi-slot (TBoMS) PUSCH, where a DCI message schedules a TBoMS PUSCH with a plurality of segments, such as segment #1, segment #2, and segment #3.

With reference to FIG. 9, repetition Type A like TDRA of PUSCH with TBoMS has one segment in one slot, such as segment #1 in slot #1, segment #2 in slot #2, and segment #3 in slot #3. Repetition Type B like TDRA of PUSCH with TBoMS has one segment allocated to one or more adjacent slots, such as segment #3 is allocated to slot #2 and slot #3 in back to back.

For PUSCH with TBoMS, it is not yet determined whether to use PUSCH repetition type A like TDRA and/or PUSCH repetition type B like TDRA.

For RepTypeA like TDRA. TBoMS PUSCH may support intra-slot FH as shown in Case 15 in FIG. 10 and inter-slot FH as shown in Case 16 in FIG. 10.

For RepTypeB like TDRA. TBoMS PUSCH also support intra-slot FH as shown in Case 17 in FIG. 10 and inter-slot FH as shown in Case 18 in FIG. 10. But inter-repetition FH is unsupported by TBoMS PUSCH.

Figure 10:
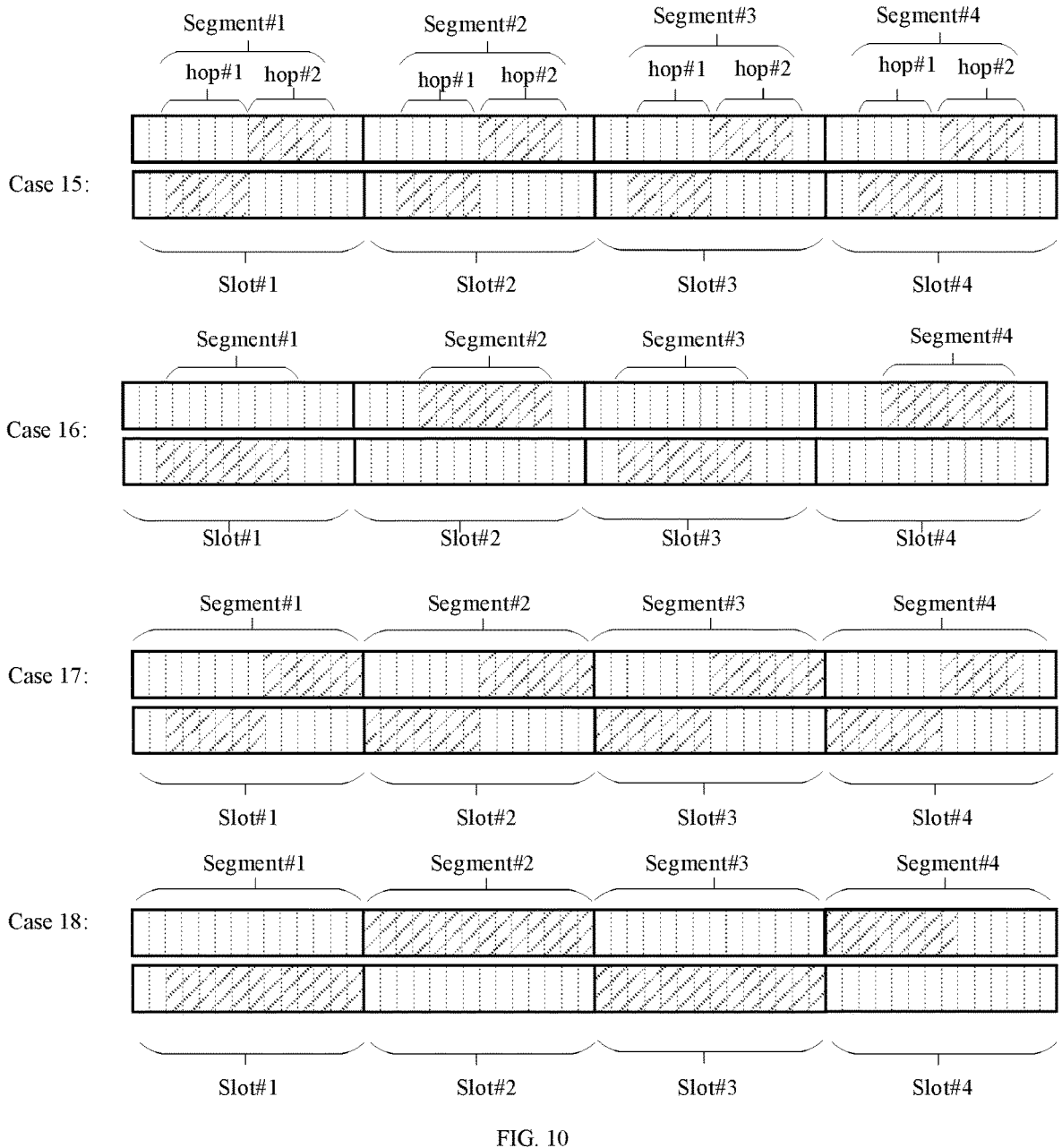
FIG. 10 illustrates a schematic view showing cases 10 to 14 of uplink configuration.

With reference to FIG. 10. Case 15 is an example of TBoMS PUSCH (Repetition Type A like TDRA) with intra-slot FH. Case 16 is an example of TBoMS PUSCH (Repetition Type A like TDRA) with inter-slot FH. Case 17 is an example of TBoMS PUSCH (Repetition Type B like TDRA) with intra-slot FH. Case 18 is an example of TBoMS PUSCH (Repetition Type B like TDRA) with inter-slot FH.

All bundling cases except case 4 and case 8 in the aforementioned embodiments are applicable for PUSCH with TBoMS. Because for TBoMS PUSCH of repetition type B like TDRA, the FH type and the bundling type cannot be set to inter-repetition.

For TBoMS PUSCH of repetition type A like TDRA, the inter-repetition bundling type may be interpreted as or replaced by inter-segment, which means a bundle starts from the first OFDM symbol of the first slot of the bundle and end in the last OFDM symbol of the last slot of the bundle.

The bundling function is similar to that described in the aforementioned embodiments, but configuration parameters are determined based on the contents that described in this embodiment.

The coverage enhancement configuration comprises time domain resource allocation (TDRA) configuration of the segments of the transport block. The TDRA configuration comprises an indication of non-back-to-back TDRA or back-to-back TDRA of the segments of the transport block. In the non-back-to-back TDRA, two adjacent segments in the segments of the transport block are separately allocated to two slots. In the back-to-back TDRA, transmission of the transport block is back-to-back allocated to one or more adjacent slots. In other words, two adjacent segments in the segments of the transport block are back-to-back allocated to one or more adjacent slots. The frequency hopping (FH) type of the frequency hopping function indicates one of the intra-slot FH or the inter-slot FH applicable to the non-back-to-back TDRA or indicates one of the intra-slot FH or the inter-slot FH applicable to the back-to-back TDRA.

The bundling configuration of the coverage enhancement representations comprises one or more of:

an indication for enabling or disabling of a bundling function for the coverage enhancement representations of the at least one transport block; and an indication of a mode configuration of the bundling function for the coverage enhancement representations of the at least one transport block.

The mode configuration of the bundling function comprises one or both of a bundling type and a bundling size, the bundling type indicates inter-slot bundling or inter-segment bundling for type A like TDRA or indicates inter-slot bundling or inter-TB bundling for type B like TDRA, and the bundling size indicates a number of slots for the inter-slot bundling or a number of segments for the inter-segment bundling. The bundling configuration of the coverage enhancement representations may be included in a message of downlink control information (DCI), radio resource control (RRC), or configured grant (CG) configuration.

The bundling configuration comprises a list of modulation and coding schemes for bundles of the coverage enhancement representations. When a non-zero gap is between two consecutive bundles in the bundling function, the UE, during the gap, performs downlink reception or uplink transmission with a different phase or a different power level. The base station 20, during the gap, performs downlink transmission or uplink reception with a different phase or a different power level.

Time Domain Window (TDW) and Bundling:

In an embodiment of the invention, the coverage enhancement configuration may further comprise time domain window (TDW) configuration of the coverage enhancement representations. The term of TDW may be changed during 3GPP standardization efforts.

In the topic of coverage enhancement, a time domain window used in the specification and can be replaced by other technical terms. The base station 20, such as a gNB, configures the time domain window, such that the UE 10 maintains power consistency and phase continuity among PUSCH transmissions during the window. All of the schemes in the aforementioned embodiments may be applied to the time domain windows.

When the bundling configuration conflicts with the time domain window configuration, the UE 10 and the base station 20 may perform the following options:

Option 1: The UE 10 is not expected to be configured both of the time domain window configuration and the bundling configuration. The base station 20 ensures that the time domain window configuration and the bundling configuration are not configured at the same time. The base station 20 ensures that the time domain window configuration and the bundling configuration are not configured for the same set of uplink transmissions, such as PUSCHs or PUCCHs.

Figures 11, 12:
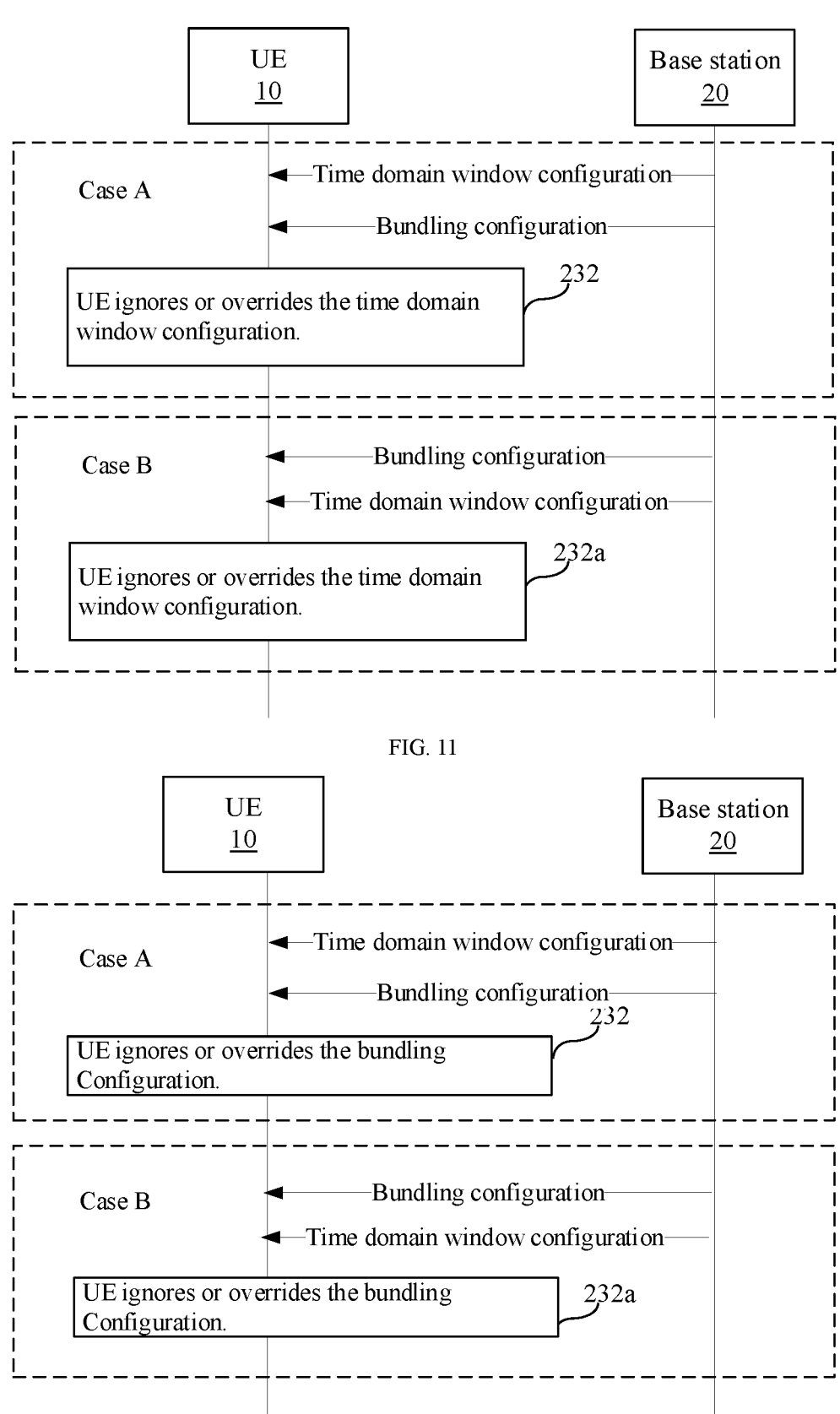
FIG. 11 illustrates a schematic view showing cases A and B where bundling configuration is preferred.
FIG. 12 illustrates a schematic view showing cases A and B where time domain window configuration is preferred.

Option 2: If the UE 10 is configured both of the time domain window configuration and the bundling configuration, the UE 10 prefers the bundling configuration. With reference to FIG. 11, specifically, when the base station 20 provides both of the time domain window configuration and the bundling configuration to the UE 10, the UE 10 prioritizes the bundling configuration over the time domain window configuration when the bundling configuration conflicts with the time domain window configuration. When the base station 20 sends the time domain window configuration and the bundling configuration to the UE 10 sequentially, the UE ignores or overrides the time domain window configuration (step 232). When the base station 20 sends the bundling configuration and the time domain window configuration to the UE 10 sequentially, the UE ignores or overrides the time domain window configuration (step 232a). In the embodiment of the invention, the priorities of the bundling configuration over the time domain window configuration may be sent from the base station 20 to the UE 10.

The UE 10 always ignores or overrides the configuration of the time domain window no matter which of the time domain window configuration and the bundling configuration is received first. The two configuration are for the same PUSCH(s) transmission.

Option 3: If the UE 10 is configured both of the time domain window configuration and the bundling configuration, the UE 10) prefers the time domain window configuration. Specifically, when the base station 20 provides both of the time domain window configuration and the bundling configuration to the UE 10, the UE 10 prioritizes time domain window configuration over the bundling configuration when the bundling configuration conflicts with the time domain window configuration. With reference to FIG. 12. When the base station 20) sends the time domain window configuration and the bundling configuration to the UE 10 sequentially, the UE ignores or overrides the bundling configuration (step 233). When the base station 20 sends the bundling configuration and the time domain window configuration to the UE 10 sequentially, the UE ignores or overrides the bundling configuration (step 233a). The priorities of the bundling configuration over the time domain window configuration may be sent from the base station 20 to the UE 10.

the UE 10 always ignores or overrides the bundling configuration no matter which of the time domain window configuration and the bundling configuration is received first. The two configurations are for the same PUSCH(s) transmission. Alternatively, the UE 10 prioritizes first received one of the bundling configuration or the time domain window configuration over later received one of the bundling configuration or the time domain window configuration when the bundling configuration conflicts with the time domain window configuration.

Option 4: The base station 20 ensures that the two configurations do not conflict.

Option 5: The bundling configuration is only used for cases with FH, and the time domain window configuration is used for cases without frequency hopping. The base station 20 provides and transmits the bundling configuration for a frequency hopping function and the time domain window configuration for a non-frequency-hopping function to the UE 10. The UE 10 receives the bundling configuration for a frequency hopping function and the time domain window configuration for a non-frequency-hopping function.

Option 6. The bundling configuration is only used for cases with FH, and the time domain window configuration is used for cases both with or without FH. On this basis, the rules in option 1 to option 4 are followed for the overlapping part of the time domain window configuration and the bundling configuration. The base station 20 provides and transmits the time domain window configuration and the bundling configuration for a frequency hopping function to the UE 10. The UE 10 receives the time domain window configuration and the bundling configuration for a frequency hopping function.

The time domain window configuration of the coverage enhancement representations comprises one or more of:

an indication for enabling or disabling of a time domain window function for the coverage enhancement representations of the at least one transport block; and an indication of a mode configuration of the time domain window function for the coverage enhancement representations of the at least one transport block.

TABLE 19

| | PUSCH repetition Type A | | | PUSCH repetition Type B | | |
|---|---|---|---|---|---|---|
| | without FH | Intra-slot FH | Inter-slot FH | without FH | Inter-slot FH | Inter-repetition FH |
| Inter-slot TDW | Case 5a | X | Case 1a | Case 7a | Case 3a | X |
| Inter-repetition TDW | Case 6a | X | Case 2a | Case 8a | X | Case 4a |

Figure 13:
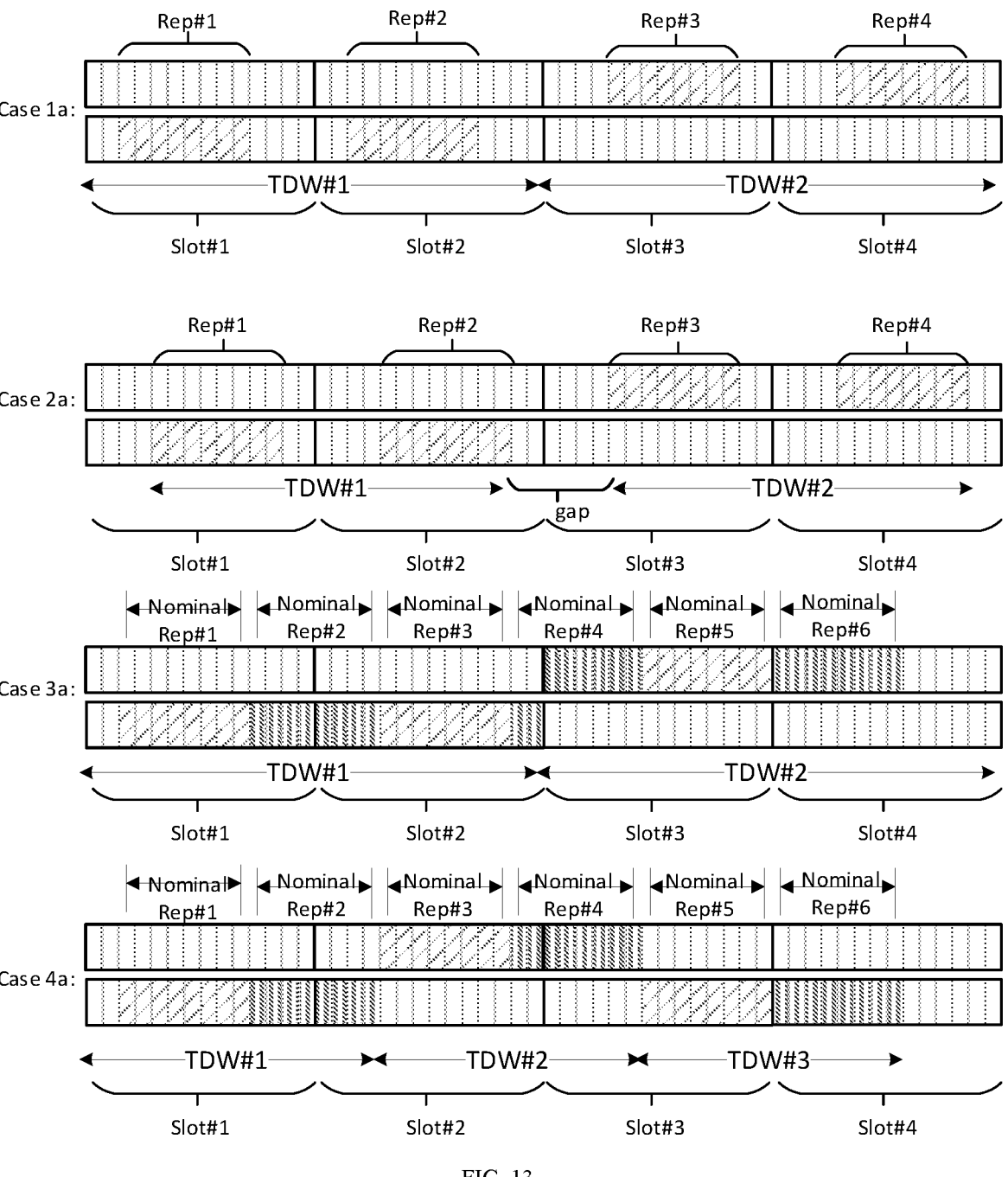
FIG. 13 illustrates a schematic view showing cases 1a to 4a of uplink time domain window (TDW) configuration.
Figure 14:
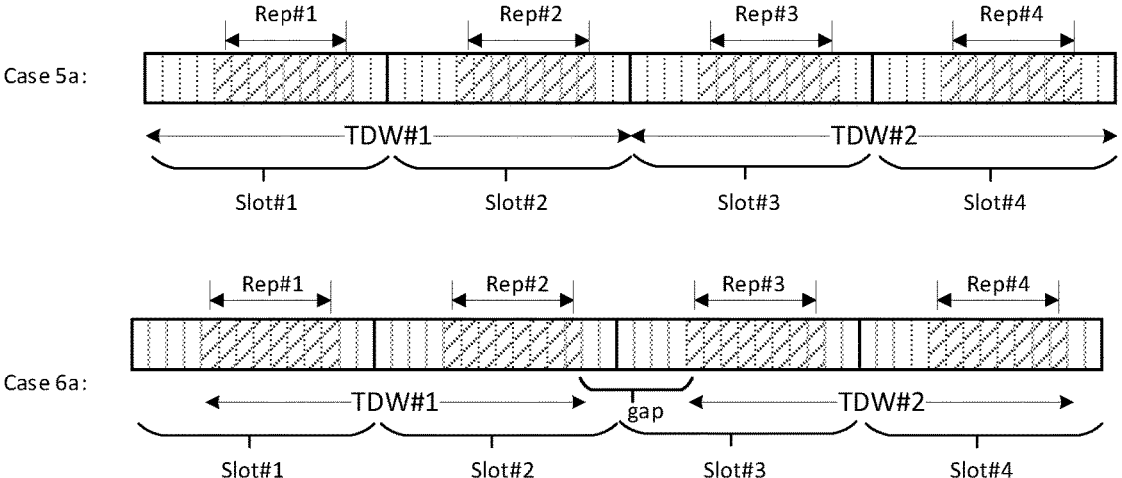
FIG. 14 illustrates a schematic view showing cases 5a to 8a of uplink TDW configuration.
Figure 14:
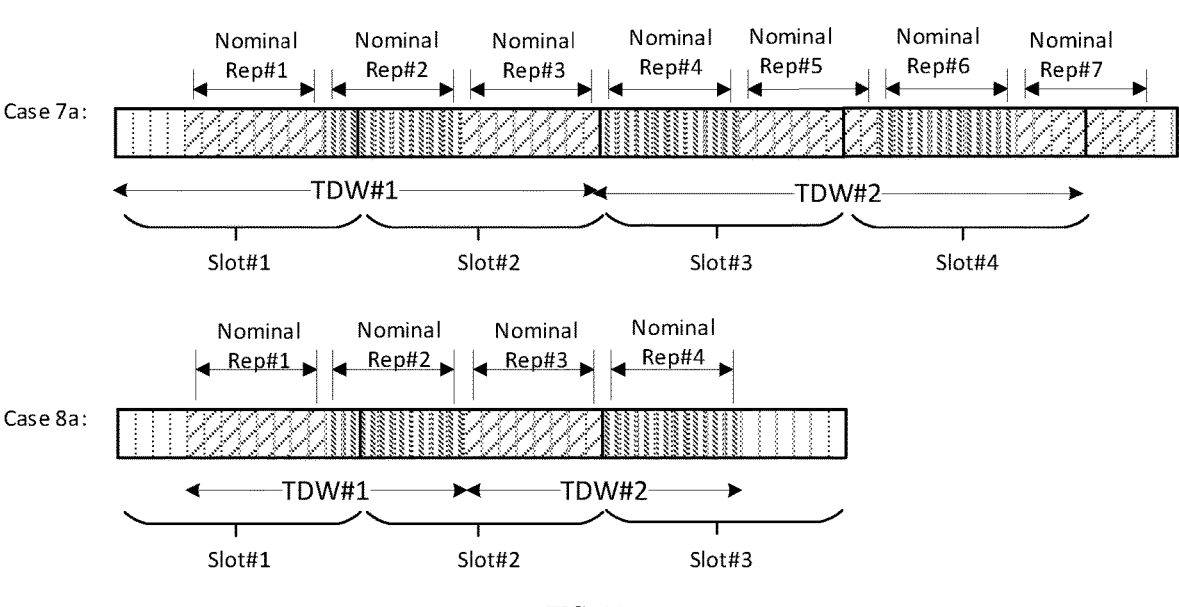

Table 19 shows possible TDW combinations for PUSCH repetition type A/B. FIG. 13 and FIG. 14 show the cases in Table 19. TDW type can be indicated implicitly by the FH type. An explicit indication of the TDW configuration including TDW type and TDW size is not excluded. The TDW configuration including TDW type and TDW size should be configured by higher layer parameter (e.g. PUSCH configuration or configured UL grant) or a DCI (e.g. DCI 0_x) field explicitly or implicitly.

The coverage enhancement representations of the at least one transport block comprise repetitions of one transport block. The mode configuration of the time domain window function comprises one or both of a time domain window type and a time domain window size. The time domain window type indicates inter-slot time domain window or inter-repetition time domain window, and the time domain window size indicates a number of slots for the inter-slot time domain window or a number of repetitions for the inter-repetition time domain window.

The coverage enhancement configuration comprises repetition type of the repetitions of the transport block. The repetition type comprises an indication of a repetition type A or a repetition type B of the repetitions of the transport block. In the repetition type A, two adjacent repetitions in the repetitions of the transport block are separately allocated to two or more slots.

In the repetition type B, two adjacent nominal repetitions in the repetitions of the transport block are back-to-back allocated to one or more adjacent slots. The frequency hopping (FH) type of the frequency hopping function indicates one of the intra-slot FH or inter-slot FH applicable to the repetition type A, one of inter-slot FH or inter-repetition FH applicable to the repetition type B.

The coverage enhancement representations of the at least one transport block comprise segments of one transport block in a transmission mode of one TB over multi-slot (TBoMS). The mode configuration of the time domain window function comprises one or both of a time domain window type and a time domain window size. The time domain window type indicates inter-slot time domain window or inter-segment time domain window for type A like TDRA or indicates inter-slot time domain window or inter-TB time domain window for type B like TDRA, and the time domain window size indicates a number of slots for the inter-slot time domain window or a number of segments for the inter-segment time domain window.

Figure 15:
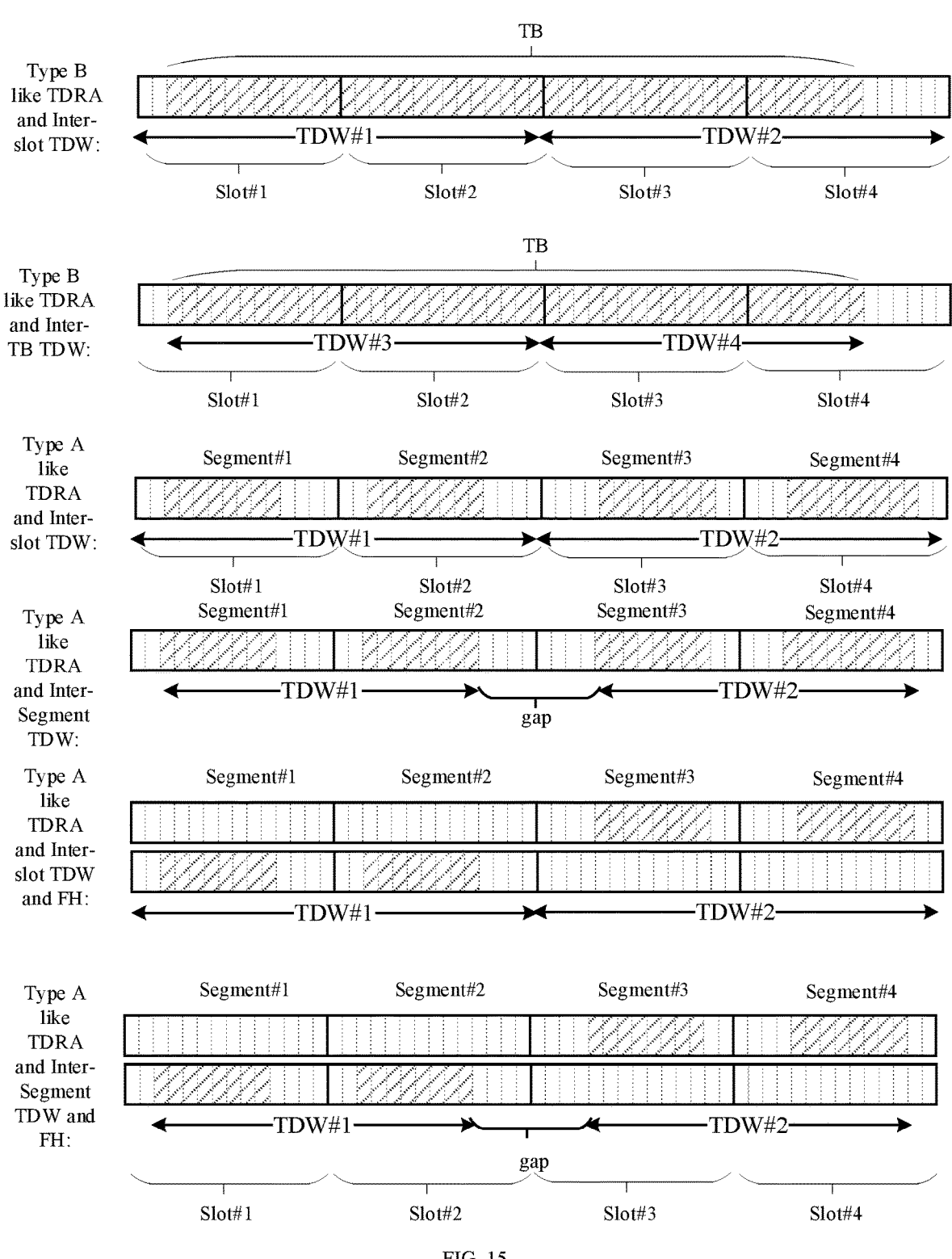
FIG. 15 illustrates a schematic view showing examples of inter-slot TDWs and inter-segment TDWs.

The coverage enhancement configuration comprises time domain resource allocation (TDRA) configuration of the segments of the transport block. The TDRA configuration comprises an indication of non-back-to-back TDRA or back-to-back TDRA of the segments of the transport block. In the non-back-to-back TDRA, two adjacent segments in the segments of the transport block are separately allocated to two slots. In the back-to-back TDRA, transmission of the transport block is back-to-back allocated to one or more adjacent slots. In other words, two adjacent segments in the segments of the transport block are back-to-back allocated to one or more adjacent slots. FIG. 15 shows a type B like example of TBoMS PUSCH scheduling with inter-slot TDW and without FH, a type B like example of multi-PUSCH scheduling with inter-TB TDW and without FH, a type A like example of TBoMS PUSCH scheduling with inter-slot TDW and without FH, a type A like example of multi-PUSCH scheduling with inter-TB TDW and without FH, a type A like example of multi-PUSCH scheduling with inter-TB TDW and with inter-slot FH, and a type A like example of multi-PUSCH scheduling with inter-slot TDW and with inter-slot FH. The frequency hopping (FH) type of the frequency hopping function indicates one of the intra-slot FH or the inter-slot FH applicable to the non-back-to-back TDRA, one of the inter-slot FH or the intra-slot FH applicable to the back-to-back TDRA.

The coverage enhancement representations of the at least one transport block comprise a plurality of transport blocks scheduled by a message of uplink scheduling downlink control information (DCI).

Figures 16, 17:
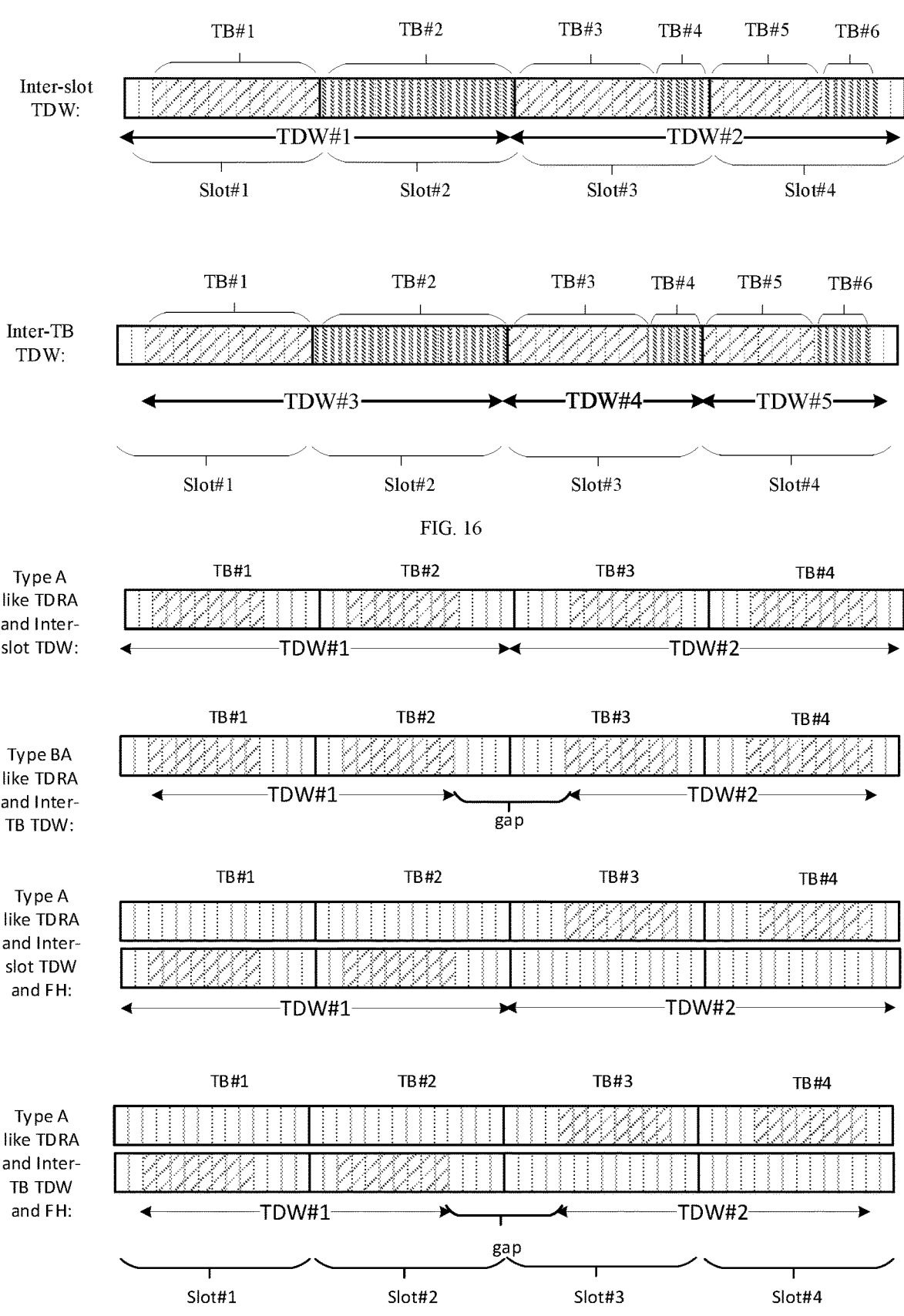
FIG. 16 illustrates a schematic view showing examples of inter-slot TDWs and inter-TB TDWs.
FIG. 17 illustrates a schematic view showing examples of inter-slot TDWs and inter-TB TDWs.

The mode configuration of the time domain window function comprises one or both of a time domain window type and a time domain window size. The time domain window type indicates inter-slot time domain window or inter-TB time domain window, and the time domain window size indicates a number of slots for the inter-slot time domain window or a number of TBs for the inter-TB time domain window. With reference to FIG. 16, an example TDW #1 of an inter-slot TDW comprises TB #1 in slot #1 and TB #2 in slot #2. TDW #2 comprises TB #3 and TB #4 in slot #3 and TB #5 and TB #6 in slot #4. An example TDW #3 of an inter-slot TDW comprises TB #1 in slot #1 and TB #2 in slot #2. An example TDW #4 of the inter-slot TDW comprises TB #3 and TB #4 in slot #3. An example TDW #5 of the inter-slot TDW comprises TB #5 and TB #6 in slot #4. FIG. 17 shows an example of multi-PUSCH scheduling with inter-slot TDW and without FH, an example of multi-PUSCH scheduling with inter-TB TDW and without FH, an example of multi-PUSCH scheduling with inter-TB TDW and with inter-slot FH, an example of multi-PUSCH scheduling with inter-slot TDW and with inter-slot FH.

Figure 18:
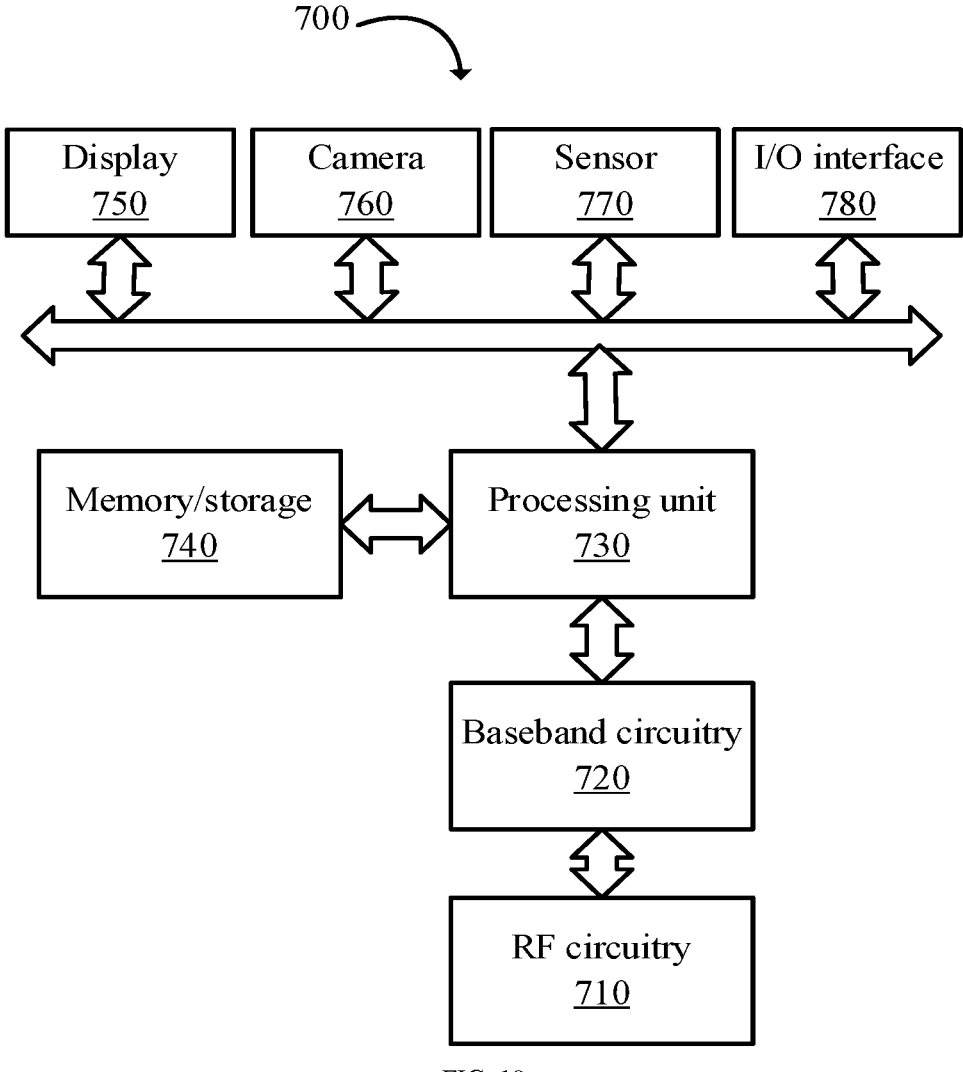
FIG. 18 illustrates a schematic view showing a system for wireless communication according to an embodiment of the present disclosure.

The coverage enhancement configuration comprises time domain resource allocation (TDRA) configuration of the plurality of transport blocks. The TDRA configuration comprises an indication of non-back-to-back TDRA or back-to-back TDRA of the plurality of transport blocks. In the non-back-to-back TDRA, two adjacent TBs in the plurality of transport blocks are separately allocated to two slots. In the back-to-back TDRA, two adjacent TBs in the plurality of transport blocks are back-to-back allocated to one or more adjacent slots. The frequency hopping (FH) type of the frequency hopping function indicates one of the intra-slot FH or the inter-slot FH applicable to the non-back-to-back TDRA, one of the inter-slot FH or the intra-slot FH applicable to the back-to-back TDRA FIG. 18 is a block diagram of an example system 700 for wireless communication according to an embodiment of the present disclosure. Embodiments described herein may be implemented into the system using any suitably configured hardware and/or software. FIG. 18 illustrates the system 700 including a radio frequency (RF) circuitry 710, a baseband circuitry 720, a processing unit 730), a memory/storage 740), a display 750, a camera 760, a sensor 770, and an input/output (I/O) interface 780, coupled with each other as illustrated.

The processing unit 730) may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR. LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that can be adopted in 3GPP specification to create an end product.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

A user equipment (UE) and a base station uplink execute a configuration method comprising negotiating coverage enhancement configuration for uplink transmission. The UE allocates coverage enhancement representations of at least one transport block (TB) into a set of the uplink radio resources for uplink transmission based on the coverage enhancement configuration. The coverage enhancement configuration comprises bundling configuration and frequency hopping configuration of the coverage enhancement representations. The coverage enhancement representations may comprise repetitions of a TB, or segments of a TB. Alternatively, the coverage enhancement representations may comprise TBs commonly share a scheduling downlink control information (DCI) message or an uplink grant that schedules the TBs. Embodiments of this disclosure are to provide methods to solve the problem of joint channel estimation (JCE) for PUSCH. The invention provides specific methods for how to define/indicate bundling for PUSCH transmission, and the JCE conditions can also be met even in non-back-to-back transmission scenarios. This can help get a joint channel estimation gain. These methods are also applicable for PUCCH, MSG3 PUSCH and MSGA PUSCH.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. An uplink configuration method, executable in a user equipment (UE), comprising:
   receiving configuration for uplink transmission, wherein the configuration comprises bundling configuration and time domain window configuration, and the bundling configuration comprises an indication for enabling or disabling a bundling operation; and in an event that the bundling operation is enabled, applying the bundling operation to a plurality of physical uplink shared channel (PUSCH) transmissions to perform joint channel estimation for the plurality of PUSCH transmissions.

2. The uplink configuration method of claim 1, wherein the configuration further comprises frequency hopping configuration of a frequency hopping function, and the frequency hopping configuration comprises an indication of a mode configuration of the frequency hopping function for representations of at least one transport block, and the mode configuration of the frequency hopping function comprises a frequency hopping type.

3. The uplink configuration method of claim 2, further comprising receiving a control signal carrying an indication for enabling or disabling of the frequency hopping function for the representations of the at least one transport block.

4. The uplink configuration method of claim 2, wherein the bundling configuration of the representations comprises:
an indication of a mode configuration of the bundling function for the representations of the at least one transport block.

5. The uplink configuration method of claim 4, wherein the bundling configuration of the representations is implicitly represented by the frequency hopping configuration.

6. The uplink configuration method of claim 4, wherein the bundling configuration of the representations is included in a message of downlink control information (DCI), radio resource control (RRC), or configured grant (CG) configuration.

7. The uplink configuration method of claim 4, wherein the bundling configuration comprises a list of modulation and coding schemes for bundles of the representations.

8. The uplink configuration method of claim 4, wherein when a non-zero gap is between two consecutive bundles in the bundling function, the UE, during the gap, performs downlink reception or uplink transmission with a different phase or a different power level.

9. The uplink configuration method of claim 4, wherein the bundling configuration comprises a field of the upper limit of bundles, which represents an upper limit of bundles in the bundling function, and the UE stops bundling operations in the bundling function when bundles of the bundling function reach the upper limit.

10. The uplink configuration method of claim 2, wherein the at least one transport block comprises a physical uplink shared channel (PUSCH) or a physical uplink control channel (PUCCH).

11. An uplink configuration method, executable in a base station, comprising:
transmitting configuration for uplink transmission, wherein the configuration comprises bundling configuration and time domain window configuration, and the bundling configuration comprise an indication for enabling or disabling a bundling operation; and
in an event the bundling operation is enabled, applying the bundling operation to a plurality of physical uplink shared channel (PUSCH) transmissions received from the UE to perform joint channel estimation for the plurality of PUSCH transmissions.

12. The uplink configuration method of claim 11, wherein the configuration further comprises frequency hopping configuration of a frequency hopping function, and the frequency hopping configuration comprises an indication of a mode configuration of the frequency hopping function for representations of at least one transport block, and the mode configuration of the frequency hopping function comprises a frequency hopping type.

13. A user equipment (UE) comprising:
a processor, configured to call and run a computer program stored in a memory, to cause a device in which the chip is installed to execute the method of claim 1.

14. A base station comprising:
a processor, configured to call and run a computer program stored in a memory, to cause a device in which the chip is installed to execute the method of claim 11.

15. A chip, comprising a processor, configured to call and run a computer program stored in a memory, to cause a device in which the chip is installed to execute the method of claim 1.

16. A chip, comprising a processor, configured to call and run a computer program stored in a memory, to cause a device in which the chip is installed to execute the method of claim 11.

17. The uplink configuration method of claim 1, wherein the bundling configuration comprise a bundling size to indicates a number of slots for bundling.

18. The uplink configuration method of claim 1, wherein an inter-slot frequency hopping pattern with an inter-slot bundling size is based on the bundling configuration and/or the time domain window configuration.

19. The uplink configuration method of claim 11, wherein the bundling configuration comprise a bundling size to indicates a number of slots for bundling.

20. The uplink configuration method of claim 11, wherein an inter-slot frequency hopping pattern with an inter-slot bundling size is based on the bundling configuration and/or the time domain window configuration.

* * * * *